United States Patent
Shukair et al.

(10) Patent No.: US 9,743,330 B2
(45) Date of Patent: Aug. 22, 2017

(54) METHODS AND APPARATUS FOR REDUCING HANDOVER SIGNALING DURING WIRELESS COMMUNICATION PROCEDURES

(71) Applicant: QUALCOMM Incorporated, San Diego, CA (US)

(72) Inventors: Mutaz Zuhier Afif Shukair, San Diego, CA (US); Mouaffac Ambriss, San Diego, CA (US); Saad Zaidi, San Diego, CA (US); Salil Sawhney, San Diego, CA (US); Ritesh Suresh Gujarathi, San Diego, CA (US); Mukesh Kumar Mittal, San Diego, CA (US); Shyamal Ramachandran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 14/832,648

(22) Filed: Aug. 21, 2015

(65) Prior Publication Data

US 2017/0055197 A1   Feb. 23, 2017

(51) Int. Cl.
*H04W 4/00* (2009.01)
*H04W 36/30* (2009.01)
(Continued)

(52) U.S. Cl.
CPC .......... *H04W 36/30* (2013.01); *H04W 36/00* (2013.01); *H04W 36/165* (2013.01); *H04W 36/0022* (2013.01)

(58) Field of Classification Search
CPC combination set(s) only.
See application file for complete search history.

(56) References Cited

U.S. PATENT DOCUMENTS 6,647,261 B1 * 11/2003 Banerjee ............... H04W 48/20
370/331
8,780,864 B2 * 7/2014 Rydnell ................ H04W 36/14
370/331
(Continued)

FOREIGN PATENT DOCUMENTS

EP      2244504 A1    10/2010
WO      WO-0209452 A2    1/2002

OTHER PUBLICATIONS

White Paper, VoLTE with SRVCC: The second phase of voice evolution for mobile LTE devices, 10 pages, Oct. 2012.*
(Continued)

*Primary Examiner* — Frank Duong
(74) *Attorney, Agent, or Firm* — Knobbe, Martens, Olson & Bear, LLP

(57) ABSTRACT

Methods and apparatuses for wireless communications are disclosed. For example, one method includes detecting a procedure and determining the procedure is a qualifying procedure. The method further includes detecting one or more handover events indicative of handover procedures, where the handover procedures interfere with the execution of the qualifying procedure. The method also includes comparing a radio frequency condition of the communication between a user equipment and a source access point with a threshold value based on the radio frequency condition and delaying handover procedures for a predefined time based on the comparison, wherein the delaying of the handover procedures occurs when the detected procedure is the qualifying procedure and when the radio frequency condition satisfies a threshold that is based on the threshold value.

30 Claims, 11 Drawing Sheets

(51) Int. Cl.
 H04W 36/00 (2009.01)
 H04W 36/16 (2009.01)

(56) References Cited

U.S. PATENT DOCUMENTS

| | | |
|---|---|---|
| 9,241,290 B2 * | 1/2016 | Choi ................. H04W 36/0055 |
| 9,253,704 B1 * | 2/2016 | Sarkar .................. H04W 36/00 |
| 2008/0026756 A1 | 1/2008 | Harris et al. |
| 2013/0095839 A1 | 4/2013 | Venkatraman et al. |
| 2013/0258888 A1 | 10/2013 | Jeong et al. |
| 2014/0112119 A1 | 4/2014 | Chen et al. |
| 2014/0254399 A1 | 9/2014 | Yang et al. |
| 2015/0049737 A1 | 2/2015 | Yang et al. |
| 2015/0163709 A1 | 6/2015 | Lee |

OTHER PUBLICATIONS

International Search Report and Written Opinion—PCT/US2016/046329—ISA/EPO—dated Nov. 25, 2016.

* cited by examiner

METHODS AND APPARATUS FOR REDUCING HANDOVER SIGNALING DURING WIRELESS COMMUNICATION PROCEDURES

BACKGROUND

Field

The present application relates generally to wireless communication systems, and more particularly, to delaying or preventing handover procedures while executing wireless communication procedures.

Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

Various implementations of methods and apparatus within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims.

One aspect of the present disclosure provides a method for wireless communications. The method includes detecting, at a user equipment, a procedure executed on a network and determining, at the user equipment, the procedure is a qualifying procedure. The method also includes detecting, at the user equipment, one or more handover events indicative of one or more handover procedures that transition the user equipment from a source access point to a target access point, wherein the transitioning of the user equipment to the target access point interferes with the execution of the qualifying procedure. In some embodiments, the transitioning of the user equipment to the target access point interferes with the execution of the qualifying procedure when at least one of the following occurs: one or more handover procedures and the qualifying procedure occur at approximately the same time, and the handover procedure is part of the execution of the qualifying procedure. The method further includes comparing, at the user equipment, a radio frequency condition of the communication between the user equipment and the source access point with a threshold value based on the radio frequency condition, and delaying all handover procedures for a predefined time by the user equipment based on the comparison of the radio frequency condition and the threshold value, where the delaying of the handover procedures occurs when the detected procedure is the qualifying procedure and when the radio frequency condition satisfies a threshold that is based on the threshold value.

In some embodiments of the method, the threshold value is dynamically adaptable based on an expected execution time of the qualifying procedure related the radio frequency condition. In other embodiments of the method, the user equipment is configured to maintain a table of one or more expected execution times for the qualifying procedure, wherein the expected execution times are based on an association of at least one past execution of the qualifying procedure with the radio frequency condition during the past execution, wherein table of expected execution times is updated after each execution of the qualifying procedure.

In some embodiments of the method, the procedure is the qualifying procedure based on a preselected list of qualifying procedures, wherein the preselected list includes at least a circuit-switched fallback procedure (CSFB). In still other embodiments of the method, the preselected list comprises at least one of: a CSFB procedure, tracking area update, voice over LTE call setup, user equipment capability information, radio link failure count inquiry, IP multimedia subsystem registration, and LTE attachment procedures.

In some implementations, the method may also include evaluating the radio frequency condition of the communication between the user equipment and the source access point. In some embodiments of the method, the radio frequency condition is based on at least one of: a reference signal received power (RSRP), reference signal received quality (RSRQ), and signal-to-interference-plus-noise ratio (SINR). In another embodiment of the method, the qualifying procedure includes an exchange of at least one or more messages. In yet another embodiment of the method, the qualifying procedure includes processing a signal internal to the user equipment, the signal being indicative of a procedure executed within the user equipment.

In one embodiment of the method, the predefined time is based, on at least one of the following: the detected procedure, the threshold value, a degradation slope of the radio frequency condition; and one or more operating characteristics of the user equipment.

Another aspect of the present disclosure provides another method is disclosed for wireless communication. The method includes detecting a procedure executed on a network, and determining the procedure is a qualifying procedure. The method also includes detecting a handover event indicative of transitioning a user equipment from a source access point to a target access point, wherein the transition of the user equipment to the target access point interferes with the execution of the qualifying procedure. The method further includes comparing a radio frequency condition of the communication between the user equipment and the source access point with a threshold value based on the radio frequency condition, and delaying a transmission of a handover criteria to the user equipment for a predefined time based on the comparison of the radio frequency condition and the threshold value, wherein the delaying of the handover criteria occurs when the detected procedure is the qualifying procedure and when the radio frequency condition satisfies a threshold that is based on the threshold value.

In one implementation of the method, the method may also include evaluating the radio frequency condition of the communication between the user equipment and the source access point. In some embodiments, the evaluating the radio frequency condition further includes receiving a measurement report indicative of the radio frequency condition between the user equipment and the source access point. In at least one implementation, the evaluating the radio frequency condition further comprises determining a distance between the source access point and the user equipment, wherein the distance is indicative of the radio frequency condition. In some implementations, the evaluating the radio frequency condition further comprises receiving a sounding reference signal at the source access point, wherein an estimate of the radio frequency condition is based on the sounding reference signal.

Another aspect of the present disclosure provides an apparatus disclosed for wireless communications. The apparatus includes a receiver configured to detect one or more handover events indicative of one or more handover procedures that transition a user equipment from a source access point to a target access point, wherein the transitioning of the user equipment to the target access point interferes with an execution of a qualifying procedure. The apparatus also includes a processor. The processor is configured to detect a procedure executed on a network, and determine the procedure is the qualifying procedure. The processor is also configured to compare a radio frequency condition of the communication between the user equipment and the source access point with a threshold value based on the radio frequency condition, and delay all handover procedures for a predefined time by the user equipment based on the comparison of the radio frequency condition and the threshold value, wherein the delaying of the handover procedures occurs when the detected procedure is the qualifying procedure and when the radio frequency condition satisfies a threshold that is based on the threshold value.

Another aspect of the present disclosure provides a system disclosed for wireless communications. The system includes a means for detecting a procedure executed on a network, and a means for determining the procedure is a qualifying procedure, the qualifying procedure includes an exchange of at least one or more messages. The system also includes a means for detecting a handover event indicative of a transition of a user equipment from a source access point to a target access point, wherein the transition of the user equipment to the target access point interferes with the execution of the qualifying procedure. The system further includes a means for comparing a radio frequency condition of the communication between the user equipment and the source access point with a threshold value based on the radio frequency condition, and a means for delaying a transmission of a handover criteria to the user equipment for a predefined time based on the comparison of the radio frequency condition and the threshold value, wherein the means for delaying is configured to delay transmission of the handover criteria when the detected procedure is the qualifying procedure and when the radio frequency condition is above the threshold value. In some implementations, the system includes a means for evaluating the radio frequency condition of the communication between the user equipment and the source access point. In some embodiments, the means for evaluating the radio frequency condition is further configured to receive a measurement report indicative of the radio frequency condition between the user equipment and the source access point. In some embodiments the means for evaluating the radio frequency condition may also include a means for determining a distance between the source access point and the user equipment, where the distance is indicative of the radio frequency condition, and a means for receiving a sounding reference signal at the source access point, wherein an estimate of the radio frequency condition is based on the sounding reference signal.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

Figure 1:
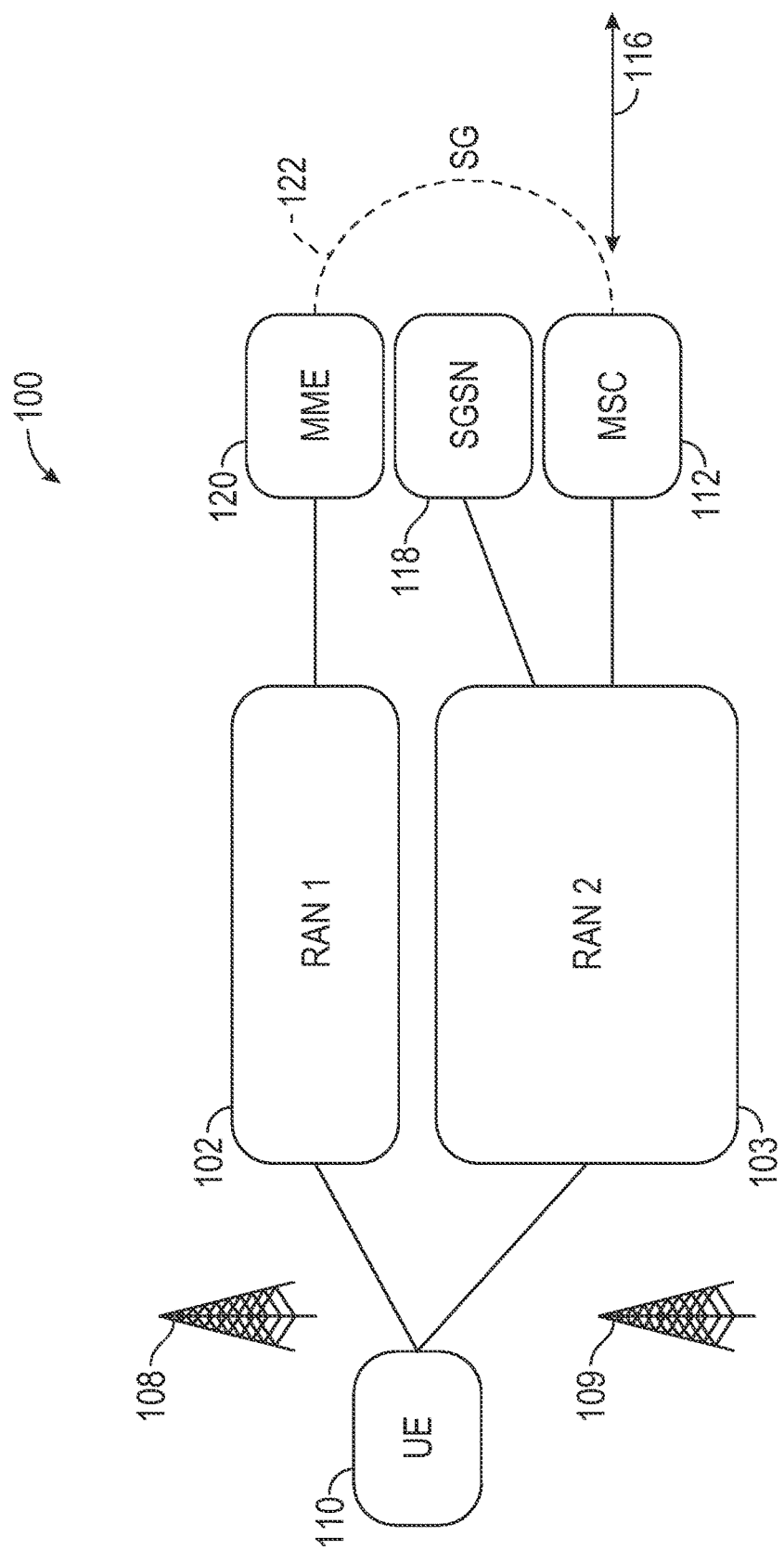
FIG. 1 is a block diagram conceptually illustrating an example telecommunications network.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The word "exemplary" is used herein to mean "serving as an example, instance, or illustration." Any implementation described herein as "exemplary' is not necessarily to be construed as preferred or advantageous over other implementations. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the implementations shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

It should be emphasized that the disclosed techniques may also be applicable to technologies and the associated standards related to LTE Advanced, LTE, W-CDMA, TDMA, OFDMA, High Rate Packet Data (HRPD), Evolved High Rate Packet Data (eHRPD), Worldwide Interoperability for Microwave Access (WiMax), GSM, enhanced data rate for GSM evolution (EDGE), and so forth. Terminologies associated with different technologies can vary. For example, depending on the technology considered, the User Equipment (UE) used in UMTS can sometimes be called a mobile station, a user terminal, a subscriber unit, an access terminal, etc., to name just a few. Likewise, Node B used in UMTS can sometimes be called an evolved Node B (eNodeB), an access node, an access point (AP), a base station (BS), HRPD base station, and so forth. It should be noted here that different terminologies apply to different technologies when applicable.

Higher layer protocols and procedures in LTE technology include of one or more messages exchanged between the UE and APs (e.g., eNodeB). When the UE transitions between APs and experiences variations in the radio frequency (RF) conditions between the UE and the APs, handover procedures and higher layer procedures (for example, circuit-switched fallback (CSFB), tracking area update (TAU), etc.) may be triggered simultaneously. Having a smooth handover procedure is critical for the Voice over LTE (VoLTE) and circuit switched call continuity as well as improved user experience. However, particularly with multi-carrier deployments of UEs, handover procedures may be triggered which interfere with the call continuity or even causes a failure in the causing poor user experience. In some circumstances, the handover procedure is triggered even though the RF conditions between the UE and the AP are of a high enough quality to permit the UE to proceed the simultaneously executed procedure on the over the current AP. Therefore, there remains a need for a mechanism, in the UE or in the telecommunications network, to decide when handover procedures can be prevented or delayed when initiated in parallel or approximately the same time as to certain higher layer protocols and procedures.

Turning to FIG. 1, a block diagram is depicted that conceptually illustrates an example telecommunications network 100. The various concepts presented throughout this disclosure may be implemented across a broad variety of UMTS network, network architectures, and communication standards. By way of example and without limitation, the aspects of the present disclosure illustrated in FIG. 1 are presented with reference to a telecommunications network employing a first RAN technology and a second RAN technology. In the embodiment illustrated in FIG. 1, the first RAN is configured to employ an advance radio access technology such as is an E-UTRAN or LTE and the second RAN is a configured to employ a legacy standard, such as 2G/3G networks. UTRAN or GSM. In this example, the telecommunications network 100 includes a first RAN 102 configured to provide various wireless services including telephony, video, data, messaging, broadcasts, and/or other services over a first RAN technology. The telecommunications network 100 also includes a second RAN 103 configured to provide various wireless services including telephony, video, data, messaging, broadcasts, and/or other services over a second RAN technology.

The geographic region covered by each first and second RAN 102 and 103, respectively, may be divided into a number of cells, with a radio transceiver apparatus serving each cell. A radio transceiver apparatus can be referred to as a base station (BS), a base transceiver station (BTS), a radio base station, a radio transceiver, a transceiver function, a basic service set (BSS), an extended service set (ESS), an AP, or some other suitable terminology. The APs used in E-UTRAN applications are commonly referred to as eNobeB. For clarity, two APs 108 and 109 are shown; however, the telecommunications network may include any number of wireless APs. AP 108 may be an eNodeB configured to provide wireless access to any number of mobile apparatuses over the first RAN 102, such as for example an LTE network. AP 109 may be a NodeB configured to provide wireless access over the second RAN 103, such as for example a legacy network. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, one UE 110 is shown in communication with AP 108 and/or 109, either individually or simultaneously. The downlink (DL), also called the forward link, refers to the communication link from an AP to a UE, and the uplink (UL), also called the reverse link, refers to the communication link from a UE to an AP.

In some embodiments where the second RAN 103 is a legacy network, the second RAN 103 is configured to support circuit-switched services with a mobile switching center (MSC) 112. The MSC 112 is an apparatus configured to control call setup, call routing, and UE mobility functions, such as the UE moving between APs of the same RAN or of different RANs. The MSC 112 also includes a visitor location register (VLR) (not shown) that contains subscriber-related information for the duration that a UE is in the coverage area of the MSC 112. A gateway MSC (GMSC) (not shown) can provide a gateway through the MSC 112 for the UE to access a circuit-switched network, as illustrated by arrow 116. The GMSC can include a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC queries the HLR to determine the UE's location and forwards the call to the particular MSC 112 serving that location.

The second RAN 103 can also be configured to support packet-data services with a serving GPRS support node (SGSN) 118 and a gateway GPRS support node (GGSN) (not shown). GPRS, which stands for General Packet Radio Service, is designed to provide packet-data services at speeds higher than those available with standard GSM circuit-switched data services. The GGSN provides a connection for the second RAN 103 to a packet-based network. The packet-based network may be the Internet, a private data network, or some other suitable packet-based network. The primary function of the GGSN is to provide the UE 110 with packet-based network connectivity over the second RAN 103. Data packets are transferred between the GGSN and the UE 110 through the SGSN 118, which performs primarily the similar functions in the packet-based domain as the MSC 112 performs in the circuit-switched domain.

In some embodiments where the first RAN 102 is an LTE network, the first RAN 102 is configured to support the transfer of data packets through a mobility management entity (MME) 120. The MME 120 is an apparatus configured to control UE 110 access to the first RAN 102 via UE paging and tagging procedures. The MME 120 is also configured to select the serving gateway (SGs) 122 for UE 110 during initial attach and to authenticate UE 110 by interacting with a home subscriber server (HSS) (not shown). The MME 120 is one apparatus that can be configured to control handover procedures of a given UE between APs due to the mobility of the UE 110 within a RAN. For example, as the UE 110 travels between the multiple cells of the first RAN 102 serviced by different APs, the UE 110 is transitioned from one AP serving the first cell where the UE 110 was located (hereinafter referred to as a "source AP") to a second AP serving a second cell to which the UE 110 is moving to (hereinafter referred to as a "target AP"). Such procedures will be described in more detail with reference to FIG. 6. The MME 120 may also be configured to control transitioning the UE between the first and second RAN technologies (e.g., CSFB, CSFB-WCDMA, CSFB-1×, CSFB-GERAN, etc.) resulting from gaps in the coverage of the networks.

Figure 2:
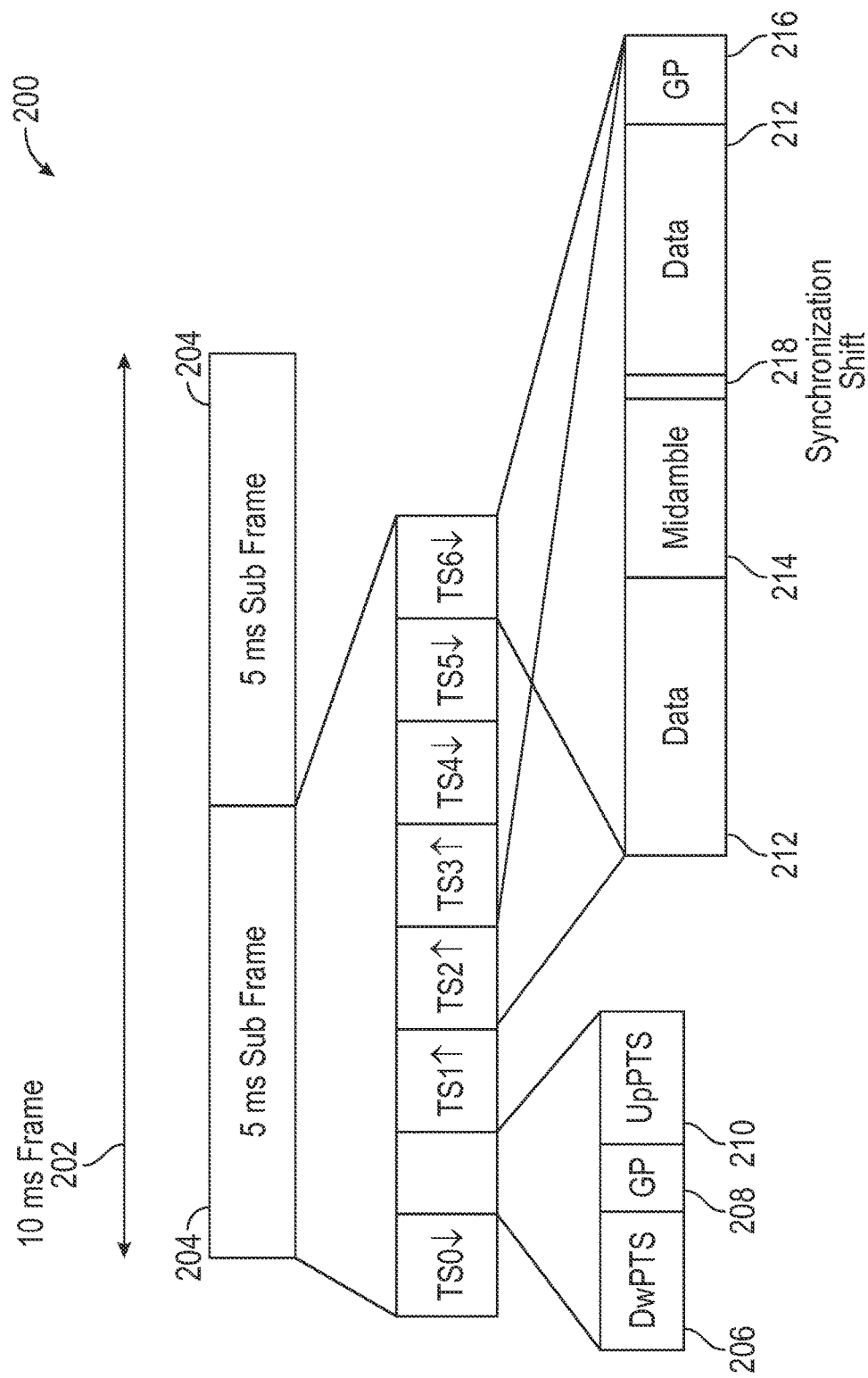
FIG. 2 is a block diagram conceptually illustrating an example of a frame structure in a telecommunications systems.

FIG. 2 is a block diagram conceptually illustrating an example of a frame structure in a telecommunications network. FIG. 2 shows a carrier frame structure 200 for an exemplary carrier, such as a TD-SCDMA carrier. While the following description relates to TD-SCDMA carriers, it will be understood that a similar carrier may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The carrier 200, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for DL communication, while the second time slot, TS1, is usually allocated for UL communication. The remaining time slots, TS2 through TS6, may be used for either UL or DL, which allows for greater flexibility during times of higher data transmission times in either the UL or DL directions. A DL pilot time slot (DwPTS) 206, a guard period (GP) 208, and an UL pilot time slot (UpPTS) 210 (also known as the UL pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. Synchronization Shift bits 218 can appear in the second part of the data portion. The SS bits 218 immediately following the midamble can indicate three cases: decrease shift, increase shift, or do nothing in the upload transmit timing. The positions of the SS bits 218 are not generally used during UL communications.

Figure 3:
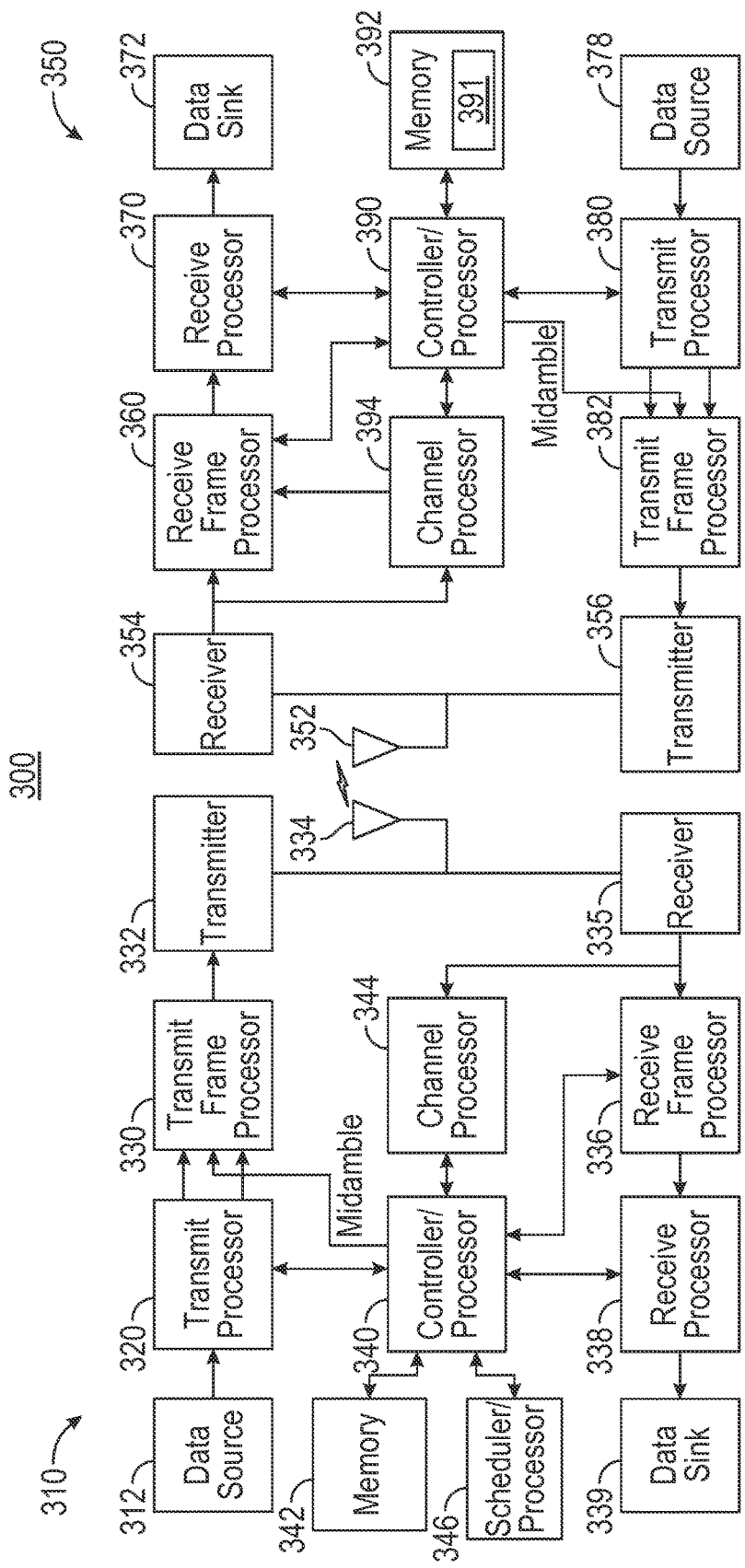
FIG. 3 is a block diagram conceptually illustrating an example of an access node in communication with an user equipment in a telecommunications network.

FIG. 3 is a block diagram of an AP 310 in communication with a UE 350 in a RAN 300, where the RAN 300 may be the first RAN 102 or second RAN 103 of FIG. 1, the AP 310 may be the AP 108 or 109 of FIG. 1, and the UE 350 may be the UE 110 of FIG. 1. In the DL communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK). M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for DL transmission over the wireless medium through smart antennas 334. The smart antennas 334 may be implemented with beam steering bidirectional adaptive antenna arrays or other similar beam technologies.

At the UE 350, a receiver 354 receives the DL transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the AP 310. More specifically, the receive processor 370 descrambles and despreads the symbols, and then determines the most likely signal constellation points transmitted by the AP 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receive processor 370, the controller/processor 390 may also use an acknowledgement (ACK) and/or negative acknowledgement (NACK) protocol to support retransmission requests for those frames.

In the UL, data from a data source 378 and control signals from the controller/processor 390 are provided to a transmit processor 380. The data source 378 may represent applications running in the UE 350 and various user interfaces (e.g., keyboard). Similar to the functionality described in connection with the DL transmission by the AP 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the AP 310 or from feedback contained in the midamble 214 (FIG. 2) transmitted by the AP 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for UL transmission over the wireless medium through the antenna 352.

The UL transmission is processed at the AP 310 in a manner similar to that described in connection with the receiver function at the UE 350. A receiver 335 receives the UL transmission through the smart antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor 340, respectively. If some of the frames were unsuccessfully decoded by the receive processor 338, the controller/processor 340 may also use an acknowledgement (ACK) and/or negative acknowledgement (NACK) protocol to support retransmission requests for those frames.

The controller/processors 340 and 390 may be used to direct the operation at the AP 310 and the UE 350, respectively. For example, the controller/processors 340 and 390 may provide various functions including timing, peripheral interfaces, voltage regulation, power management, and other control functions. The computer readable media of memories 342 and 392 may store data and software for the AP 310 and the UE 350, respectively. For example, the memory 392 of the UE 350 may store a measurement reporting module 391 which, when executed by the controller/processor 390, configures the UE 350 to transmit measurement reports based on aspects of the present disclosure. A scheduler/processor 346 at the AP 310 may be used to allocate resources to the UEs and schedule DL and/or UL transmissions for the UEs.

Figure 4:
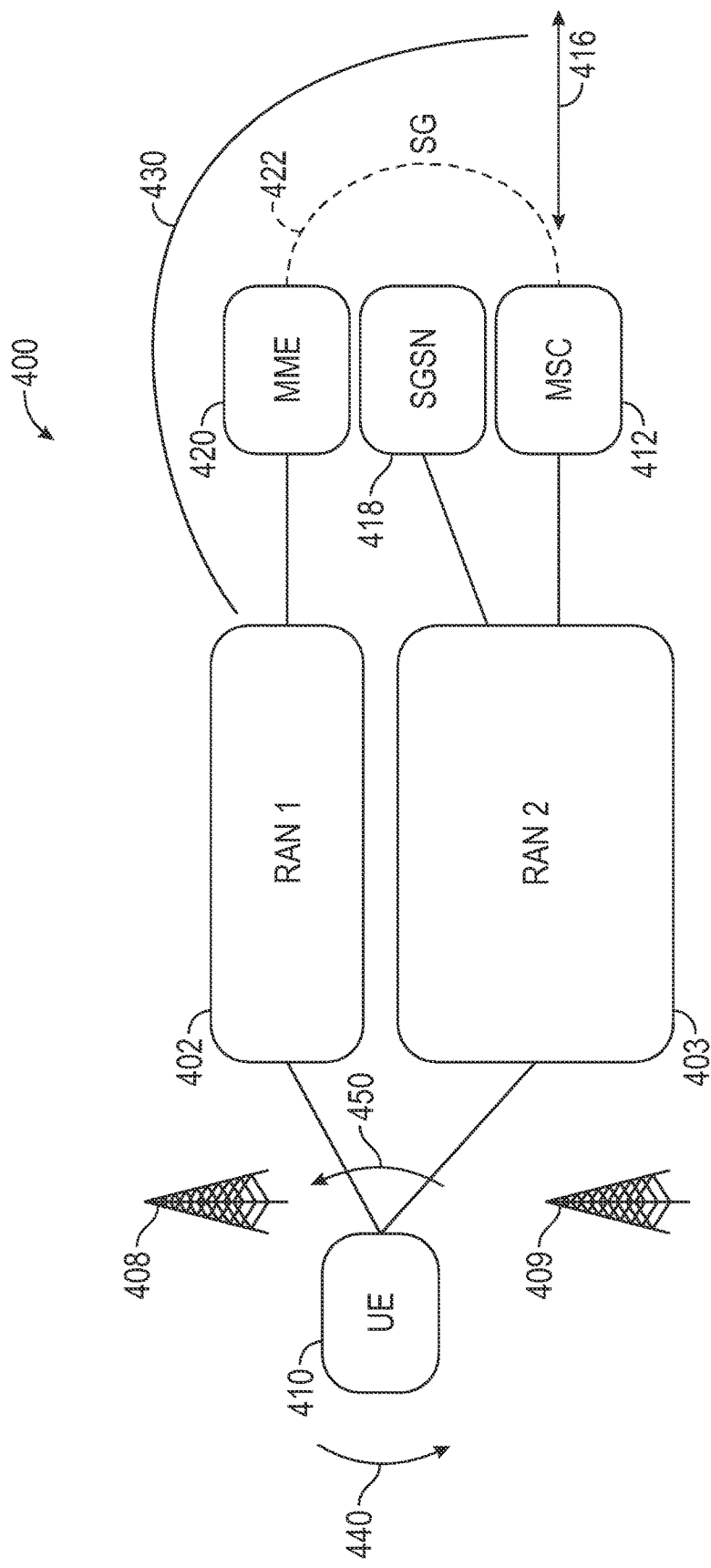
FIG. 4 is a block diagram illustrating an example telecommunications network configured to execute an exemplary circuit-switched fall back procedure.

FIG. 4 illustrates a simplified block diagram of telecommunications network 400 configured to execute an exemplary CSFB. The telecommunications network 400 may be substantially similar to the telecommunications network 100 of FIG. 1. The telecommunications network 400 may include a UE 410 in wireless communication with either or both APs 408 and 409. AP 408 is configured to provide the UE 410 access to first RAN 402, which may be substantially similar to first RAN 102 of FIG. 1 and can be an LTE or similar radio access technology as described above. AP 409 is configured to provide UE 410 access to second RAN 403, which may be substantially similar to second RAN 103 of FIG. 1 and can be a legacy network or similar radio access technology as described above.

The second RAN 403 and first RAN 402 may co-exist and reside between a UE 410 and the circuit-switched network and/or packet-based network via arrow 416. An MME 420 may be configured to serve the UE 410 while accessing the first RAN 402. Similarly, an SGSN 418 and MSC 412 are configured to serve the UE 410 for accessing the second RAN 403 for data service and voice services, respectively. The MSC 412 is configured to connect to the telephony network for providing voice services via the second RAN 403.

In one aspect, UE 410 may be operating on an established data connection over the first RAN 402. In some instances, the first RAN 402 may not be configured for telephony, thereby requiring telephony services be provided over the second RAN 403. In this situation, when a mobile terminating voice call is received by the first RAN 402, the first RAN 402 pages the UE 410 to effectuate a CSFB procedure and the UE 410 is transitioned or falls back to the second RAN 403 from the first RAN 402.

To effectuate a CSFB of the UE 410, the MME 420 is configured to connect and communicate with the MSC 412 through the serving gateway (SGs) 422. In some embodiments, the SGs 422 between the MSC 412 and the MME 420 enables the UE 410 to be registered for both circuit-switched and packet-based services while on the first RAN 402. The SGs 422 can also be configured to enable the delivery of circuit-switched pages via access with the first RAN 402 without having the UE 410 leave the first RAN 402.

In operation, the UE 410 may default to the first RAN 402. The UE 410 may be exchanging data packets with the first RAN 402 or may be idle. When a mobile terminating circuit-switched voice call is detected, a message 430 is triggered by the first RAN 402 and transmitted on the DL to the UE 410 by AP 408. The CSFB procedure is initiated in response to message 430, where the UE 410 transmits an extended service request on the UL to AP 408 and then to the telecommunications network. The extended service request may include a request to transition the UE 410 from the first RAN 402 to the second RAN 403 as illustrated by arrow 440. Once the UE 410 is transitioned from the first RAN 402 to the second RAN 403, CSFB call setup procedures can be followed via communication with AP 109 to setup the mobile terminating circuit-switched voice call on the second RAN 403. When the mobile terminating or mobile originating voice call ends, the UE 410 can be returned to the first RAN 402 via idle mode or connected mode mobility procedures, as illustrated by arrow 450.

In some embodiments, mobile originating calls (e.g., the UE 410 performs an outgoing voice call) follow a substantially similar transition from the first RAN 402 to the second RAN 403. However, in some embodiments the message 430 is not necessary to establish the transition. In some embodiments of second RAN 403, for example 3G networks, packet-switched data sessions can also be transitioned to the second RAN 403 for simultaneous voice and data services. In other embodiments of the second RAN 403, the packet-switched data sessions may be suspended until the voice call ends and the device returns to first RAN 402, unless the legacy network supports dual transfer mode, which permits simultaneous voice and data.

In some aspects, the CSFB procedure includes an exchange of messages between the various components of the telecommunications network 400. For example, the first RAN 402 may issues various messages to the UE 410 to effectuate a transition from the first RAN 402 to the second RAN 403. Similarly, the UE 410 and/or the first RAN 402 may issue messages to the various components of the second RAN 403 to enable the transition or fallback of the UE 410 to the second RAN 403.

In some aspects, the CSFB procedure employs or includes a handover procedure as part of executing the CSFB (e.g., a CSFB call setup procedure followed by a handover to the a RAN technology configured to carry out the CSFB voice call). For example, the UE 410 may be initially served by AP 408 configured to provide UE 410 access to the first RAN 402. Following the exchange of messages for CSFB call setup procedures, for example message 430, a target AP may be prepared to accept the UE 410. Where the UE 410 falls back to the second RAN 403, the target AP may be AP 409 configured to provide UE 410 access to the second RAN 403. In some embodiments, inter-radio access technology (IRAT) measurements of signal strength of either the source AP (AP 408) and/or target AP (AP 409) may be required while the UE 410 is operating on the first RAN 402 prior to making the handover. IRAT measurements of signal strength may include, but are not limited to such as a reference signal received power (RSRP), reference signal received quality (RSRQ), and/or signal-to-interference-plus-noise ratio (SINR).

Figure 5:
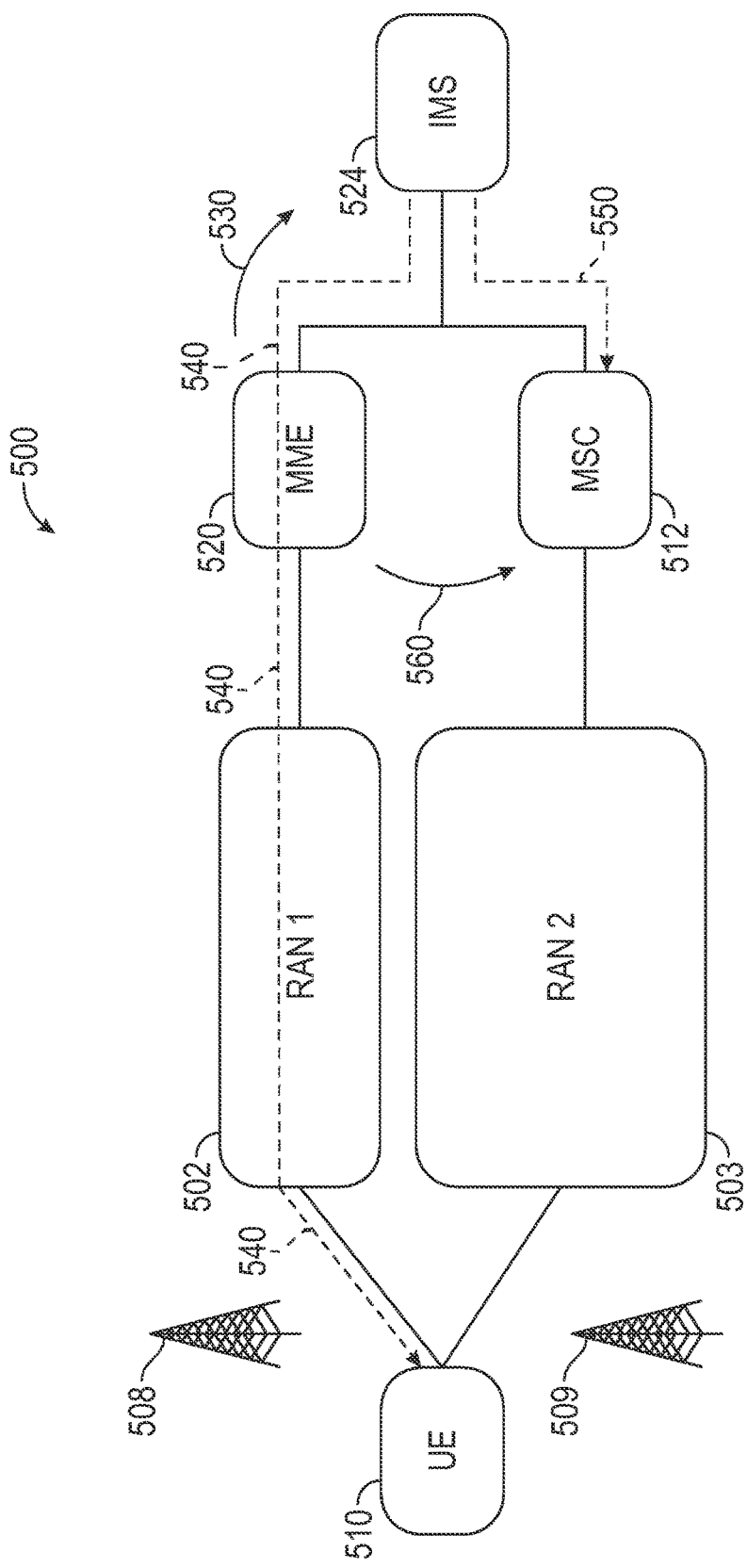
FIG. 5 is a block diagram illustrating an example telecommunications network configured to execute another exemplary circuit-switched fall back procedure.

FIG. 5 illustrates a simplified block diagram of telecommunications network 500 configured to execute another exemplary CSFB procedure. The telecommunications network 500 may be substantially similar to the telecommunications network 100 of FIG. 1. The telecommunications network 500 may include a UE 510 in wireless communication with either or both APs 508 and 509. AP 508 is configured to provide the UE 510 access to first RAN 502, which may be substantially similar to first RAN 102 of FIG. 1 and can be an LTE or similar radio access technology as described above. AP 509 is configured to provide UE 510 access to second RAN 503, which may be substantially similar to second RAN 103 of FIG. 1 and can be a legacy network or similar radio access technology as described above. The telecommunications network 500 also includes an MME 520 and an MSC 512. The MME 520 and MSC 512 may be substantially similar to MME 120 and MSC 112 as described above with reference to FIG. 1. Telecommunications network 500 can also include an IP Multimedia Subsystem (IMS) core 524 configured to provide IP multimedia services, such as voice services and data services, over the first RAN 502.

As described above, the exemplary CSFB procedure described in reference to FIG. 4 illustrates a scenario where first RAN 402 is not configured for telephony services and mobile terminating or mobile originating voice calls occurred on the second RAN 403 via the UE 410 being configured to fallback to the second RAN 403. However, FIG. 5 illustrates a situation where the first RAN 402 is configured to provide telephony services, such as VoLTE, but, due to a gap in service, the mobile terminating or mobile originating voice call is transferred from the first RAN 402 to the second RAN 403 while the voice call is in progress. FIG. 5 illustrates a procedure where the telecommunications network 500 is configured to control and guide the UE 510 from the first RAN 502 to the second RAN 503 as the UE 510 moves out of coverage of the first RAN 502.

For example, a UE 510 may be provided telephony or VoLTE services over a source AP 508 of the first RAN 502. The UE 510 may then experience a mobility event, such as the UE 510 may move outside of the geographic coverage area served by source AP 508. The UE 510 may move into a coverage area served by a target AP, and in some instances the target AP may be a second AP configured to provide service to the first RAN 502. In this situation, the UE 510 may perform a handover procedure within the first RAN 502 to transition the UE 510 from a source to a target AP within the same RAN. In other instances, the target AP may be an AP of the second RAN 503, for example AP 509. The UE 510 may be transitioned from the first RAN 502 to the second RAN 503 via a handover procedure between APs 508 and 509.

The transition of the UE 510 to the second RAN 503 can be accomplished using an IRAT handover and a session transfer. The IRAT handover may be classified as a handover of the UE from one RAN technology to a second RAN technology, such as from LTE to legacy technology, as was described above with reference to FIG. 4. Session transfer is a mechanism to move access control and voice media anchoring from the LTE Evolved Packet Core (EPC) to the legacy circuit-switched (CS) core. During the entire IRAT handover process from first RAN 502 to second RAN 503, the IMS 524 retains control of the UE 510. The handover process can be initiated by a session transfer request transmitted from MME 520 to IMS 524 as illustrated by message 530. In some embodiments, as described above with reference to FIG. 4, IRAT measurements of signal strength of either AP 508 and/or AP 509 may be required while the UE 510 is operating on the first RAN 502 prior to making the handover to the second RAN 503.

IMS 524 may be configured to respond to message 530 by transmitting two messages 540 and 550 indicative of an IRAT handover execution and a session transfer response. In some embodiments, the two messages 540 and 550 can be sent simultaneously or near in time. The IMS 524 sends one message 540 to the UE 510 via the first RAN 502 and a second message 550 to second RAN 503 via MSC 512. In this situation, the voice call may still be in progress on the first RAN 502, while the UE 510 receives the message 540 via MME 520. Message 540 may instruct the UE 510 to prepare to transition to the second RAN 503. In some embodiments, message 540 may initiate the execution of an IRAT handover procedure as part of or in conjunction with the CSFB procedure.

Meanwhile, message 550 can be transmitted to the second RAN 503. Message 550 may include a session transfer response, thereby instructing the second RAN 503 to prepare to accept the UE 510 which is performing an in-progress call. The first RAN 502 and the second RAN 503 may be configured to issue acknowledge messages as described above in response to receiving messages 540 and 550 and indicative that the instructions therein have been executed. The services supplied by the MME 520 are thereby transitioned to the MSC 512, as depicted by arrow 560, and the UE 510 is transitioned from the first RAN 502 to the second RAN 503 via arrow 570 while the voice call remains uninterrupted.

Figure 6:
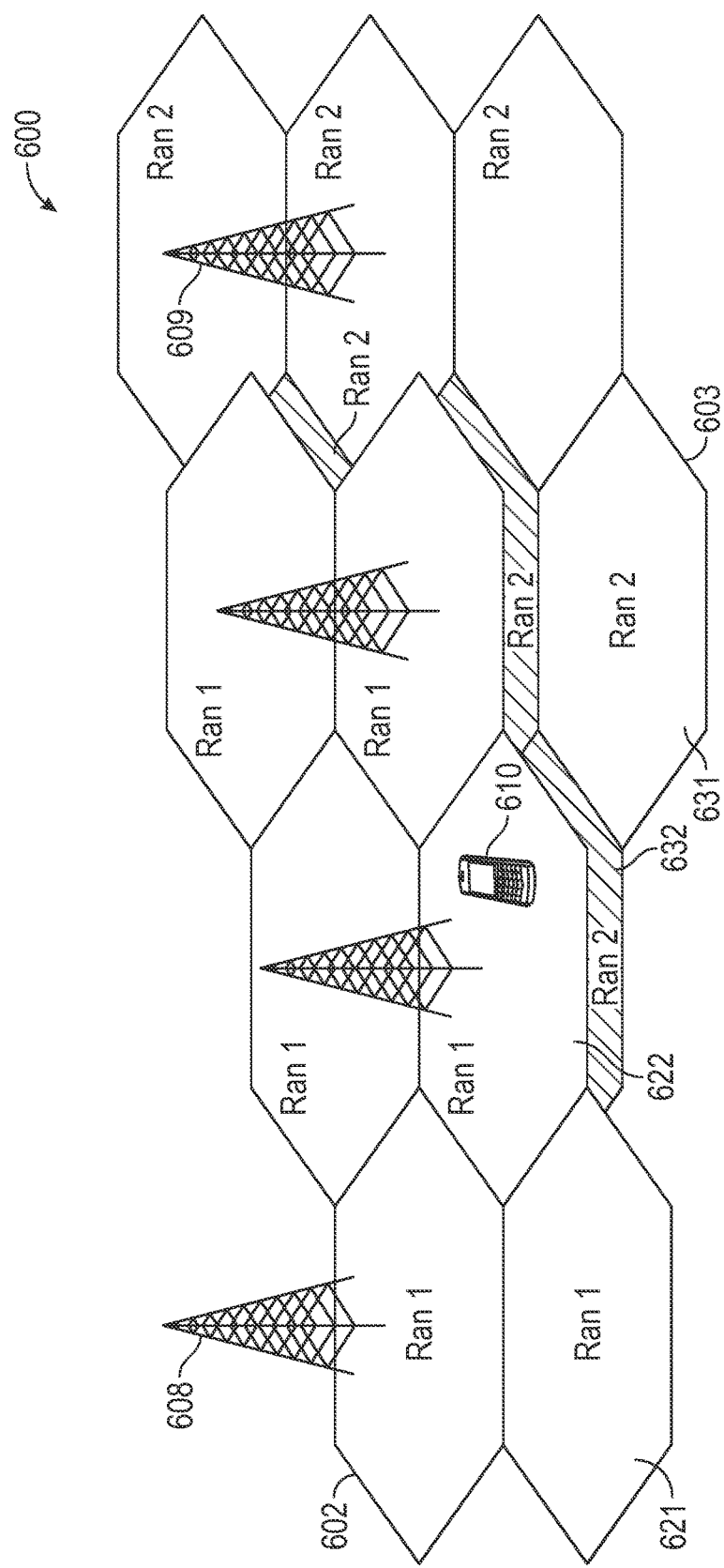
FIG. 6 illustrates a telecommunications network with radio access network technologies having multiple cells.

FIG. 6 illustrates multiple cell coverage of a first RAN 602 and coverage of a second RAN 603 within a geographic area 600. The first RAN 602 and second RAN 603 may be substantially similar to the first RANs 102, 402, 502 and second RANs 103, 403, and 503 of FIGS. 1, 4, and 5, respectively. A geographic area 600 may include multiple second RAN cells (for example, second RAN cell 631 and 632) serviced by APs (for example, AP 609) and multiple first RAN cells (for example, first RAN cell 621 and 622) serviced by APs (for example, AP 608). AP 608 may be substantially similar to AP 108, 408, or 508 of FIGS. 1, 4, and 5 and AP 609 may be substantially similar to AP 109, 409, or 509 of FIGS. 1, 4, and 5.

UE 610 may move from one cell, such as first RAN cell 622, to cell of the second RAN, such as a second RAN cell 631 or 632. Movement of this type represents UE mobility between RAN technologies (also referred to as inter-radio access technology mobility). In another embodiment, the UE 610 may move from a first RAN cell 622 of the first RAN network to a second cell of the first RAN network, such as first RAN cell 621. Movement of this type represents UE mobility within a given RAN technology but between different geographic regions serviced by different APs. The movement of the UE 610 may result in a handover procedure being initiated to transition the UE 610 between the various APs.

One embodiment of a handover procedure may be performed when the UE moves from a coverage area of a first RAN cell 622 to the coverage area of a second RAN cell 631, or vice versa. A handover procedure may also be performed when there is a coverage hole or lack of coverage in the first RAN 602 or when there is traffic balancing between the first and second RANs 602 and 603. As part of that handover procedure, while in a connected mode with a first RAN 602, a UE 610 may be specified to perform a measurement of a neighboring cells (such as second RAN cell 631) and a measurement of the source cell (such as a first RAN cell 622). For example, the UE 610 may measure the neighbor cells of a second network for signal strength, frequency channel, and base station identity code (BSIC). The UE 610 may then connect to the strongest cell of the second RAN 603 as compared to the serving cell of the serving first RAN 602 and/or the various neighboring cells of the second RAN 603. Such measurements may include, but are not limited to RSRP, RSRQ, and SINR measurements. Exemplary uses of these measurements may include, but are not limited to, CSFB as described above with reference to FIGS. 4 and 5, and CSFB-WCDMA, CSFB-1×, CSFB-GERAN, etc.

The UE 610 may send a source AP a measurement report indicating results of measurements performed by the UE. The source AP may then trigger a handover of the UE 610 to a new AP in the second RAN 603 (e.g., a target AP) based on the measurement report. The triggering may be based on a comparison between measurements of the different RANs. The measurement may include a first RAN 602 source AP signal strength, such as but not limited to, received signal code power (RSCP) for a pilot channel (e.g., primary common control physical channel (P-CCPCH)), RSRP, RSRQ, or SINR. The signal strength may be compared to a threshold value. The threshold can be indicated to the UE through dedicated radio resource control (RRC) signaling from the network or stored within the UE based on predetermined or dynamically adjustable values. The measurement may also include a second RAN target AP received signal strength indicator (RSSI). Before handover, in addition to the measurement processes, the base station IDs (e.g., BSICs) are confirmed and re-confirmed.

Other radio access technologies, such as a wireless local area network (WLAN) (e.g., Wi-Fi) may also be accessed by a UE in addition to cellular networks. For the UE to determine nearby WLAN APs, the UE scans available WLAN channels to identify/detect if any WLAN networks exist in the vicinity of the UE. In one configuration, the UE may use first RAN 602 reception/transmission gaps to switch to the WLAN network to scan the WLAN channels. The switch to the WLAN network may be effectuated and controlled in a manner as to the second RAN 603, according to the disclosure herein.

Another embodiment of a handover procedure may be performed when the UE 610 moves from a coverage area of a cell of a first RAN 602 to the coverage area of another cell of the same first RAN 602. As part of that handover procedure, while in a connected mode with a first cell of the RAN 602, UE may be configured to perform a measurement of one or more neighboring cells of the same first RAN 602. For example, the UE 610 may measure the signal strength, frequency channel, and base station identity code (BSIC) of a serving cell of first RAN 602 and neighboring cells of first RAN 602. The UE 610 may then connect to the strongest cell of the first RAN 602, where the strongest cell may continue to be the source cell or any of the neighboring cells. Such measurements may be referred to as intra radio access technology (intra-RAT) measurements.

In operation, the intra-RAT measurement may be exchanged between the UE and the source AP via the established UL and DL between the UE and source AP. The signal strength should be of a high enough quality and strength for the source AP to be able to decode the intra-RAT measurement report from the UE and prepare target cell for handover. The connection strength and quality should be good enough for the UE to be able to decode a handover command received from the source AP.

In some telecommunications networks, handovers may be initiated and executed even though RF conditions of the source AP remains of a relatively good quality to facilitate continued communication on the source AP. In these instances, events, such as but not limited to 1G and 2A events, can trigger IRAT and intra-RAT measurement reporting. In some embodiments, the measurements and comparison for event triggers are based on the radio conditions of the source AP, such as for example the RSRP, RSRQ, and SINR. However, in some instances, the RF conditions as indicated in a handover measurement report are of a high enough quality, that a handover is not critical to the continued integrity of the user experience and/or the network operation. Such non-critical handovers may be initiated and executed due to inaccurate handover configuration communicated from the network to the UE or load balancing implemented by the network.

In some instances, a non-critical handover may be performed during a CSFB procedure, for example, the procedures described in reference to FIGS. 4 and 5 as well as CSFB-WCDMA, CSFB-1x, CSFB-GERAN. For example, the handover procedure may be initiated prior to a complete exchange of messages between the UE and source AP to complete CSFB setup procedures. In other instances the non-critical handover may be performed during general LTE procedures where uninterrupted exchange of data is necessary for improved user experience. When a non-critical handover is triggered at approximately the same time or in conjunction with one or more of these procedures, the procedure may be delayed, inhibited, or even fail. Therefore, by initiating and executing a non-critical handover procedure, an increased delay in the execution of the CSFB or LTE procedure may be experienced by the UE, because messages remained to be exchanged between the UE and AP to complete the procedure but the connection or data path was closed due to the handover.

Figure 7:
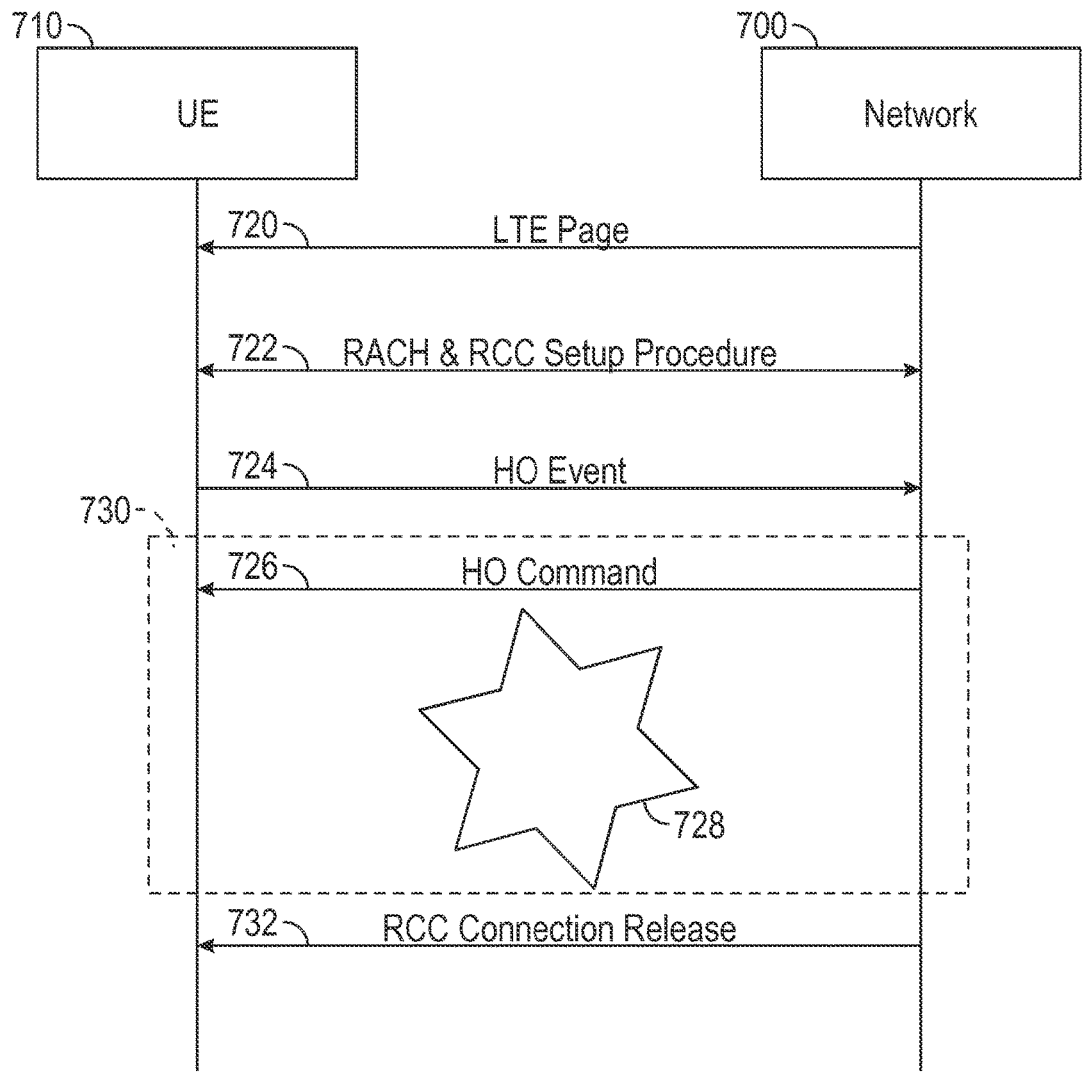
FIG. 7 illustrates an example message flow of a handover procedure and qualifying procedure.

For example, FIG. 7 illustrates an example message flow for of a CSFB procedure execution interrupted by a handover procedure. The message flow of FIG. 7 shows messages exchanged between an UE 710 and a telecommunications network 700, such as a UMTS network. For ease of explanation the number of entities shown has been limited. However, it will be understood that additional entities can be added or multiple entities combined consistent with the description herein.

Messages 720 and 722 are representative of establishing a data connection between the UE 710 and the telecommunications network 700. The UE 710 can access the network, as described above, through APs based on the geographic location of the UE 710 relative to a given AP in the telecommunications network 700. To facilitate the data connection, the telecommunications network 700 transmits an LTE page message 720 to the UE 710 via the UL. The LTE page message 720 may include a group or several messages exchanged between the UE 710 and the various components of telecommunications network 700 to establish a wireless communication connection between the UE 710 and the telecommunications network 700. Following the LTE page message 720, the UE 710 initiates ESR and RRC setup procedure to establish the data connection on the DL with the telecommunications network 700. In some embodiments, this setup procedure takes the form of a RACH and RRC setup procedure message 722 exchanged between the UE 710 and the telecommunications network 700.

At some time following the successful setup procedure, the UE 710 experience a mobility event requiring transition of the UE 710 from a source AP to a target AP. For example, the UE 710 moves from a geographic area served by the source AP to a geographic area served by the target AP. A portion of each geographic region may overlap where the UE 710 may be capable of establishing a connection via the source AP and the target AP. In this region, a handover procedure may by initiated without interrupting the connection between the UE 710 and the network 700. For example, the UE 710 may report a handover event in message 724, such as but not limited to an A3 event. This message 724 may include one or more measurement reports indicative of a change in the radio conditions, such as for example the RSRP, RSRQ, and SINR. The telecommunications network 700 may receive message 724 and transmit a handover command message 726 to facilitate the transition of UE 710 from a source AP to a target AP. The handover procedure may be carried out in a manner that is substantially similar to that described above in reference to FIG. 6.

In some instances, a CSFB or other LTE procedure may be executed in conjunction with, in parallel to, or at approximately the same time as the handover procedure. FIG. 7 depicts a procedure 730 that may be initiated prior to the handover, executed along with or in parallel to the handover, or executed in conjunction with the handover procedure. In some embodiments, the handover procedure may be initiated as a result of the execution of the procedure 730. For example, a CSFB procedure may perform an IRAT handover during the exchange of messages to carry out the CSFB. In some embodiment, the target AP may succeed in carrying out the procedure as expected. In other embodiments, the target AP may fail (e.g., failure event 728) to proceed with the CSFB or other parallel procedure as expected. Some exemplary reasons for the failure event 728 may include, but are not limited to, (1) the measurement configuration was not provided by either the source AP and/or the target AP, (2) the 1×CSFB call fails after a successful handover due to a lack of a generic circuit service notification application (GCSNA) message between a UE and a eNodeB on an LTE network, or (3) the CSFB call setup is delayed after a handover due to a lack of period reporting. In each scenario, during procedure 730 the UE 710 is disconnected from the telecommunications network 700 due to a failure event 728 in the delivery of a corresponding message exchange. Thus, a connection release message 732 is issued by network 700, for example from the source or target AP to the UE 710, and the RRC connection between the UE 710 and telecommunications network 700 is closed.

Figure 8:
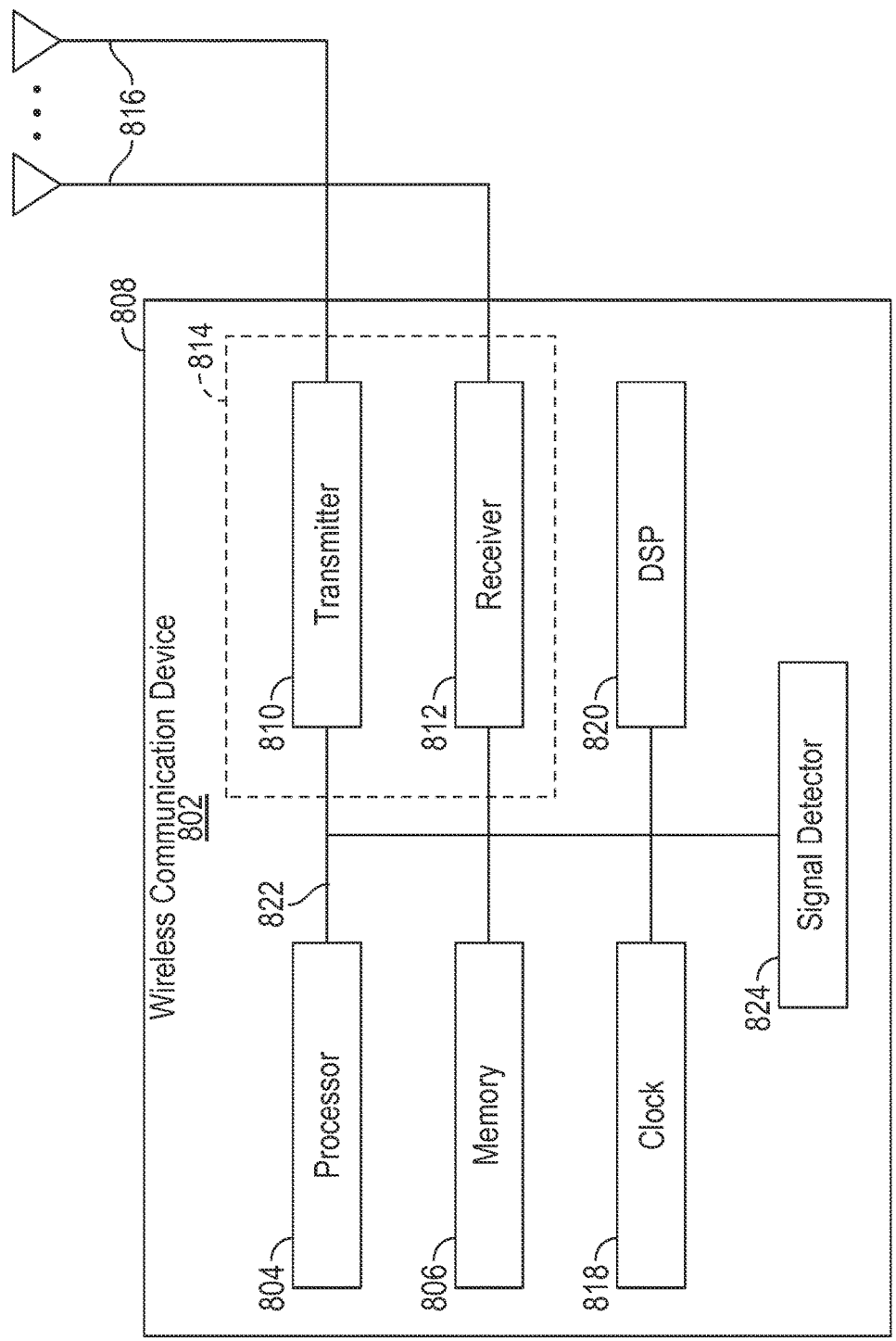
FIG. 8 illustrates an example of various components that may be utilized in a wireless communications device that may be employed within a wireless communication system.

FIG. 8 is an example of a functional block diagram illustrating various components that may be utilized in a wireless communication device 802 that may be employed within a wireless communication system, such as telecommunications network 100, 400, and 500 of FIGS. 1, 4, and 5. The wireless communication device 802 is an example of a device that may be configured to implement the various methods described herein. The wireless communication device 802 may implement an AP or a wireless communication device as described herein.

The wireless communication device 802 may include a processor 804 which controls operation of the wireless communication device 802. The processor 804 may also be referred to as a central processing unit (CPU). Memory 806, which may include both read-only memory (ROM) and random access memory (RAM), provides instructions and data to the processor 804. A portion of the memory 806 may also include non-volatile random access memory (NVRAM). The processor 804 may perform logical and arithmetic operations based on program instructions stored within the memory 806. The instructions in the memory 806 may be executable to implement the methods described herein.

The processor 804 may comprise or be a component of a processing system implemented with one or more processors. The one or more processors may be implemented with any combination of general-purpose microprocessors, microcontrollers, digital signal processors (DSPs), field programmable gate array signal (FPGA), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless communication device 802 may also include a housing 808 that may include a transmitter 810 and a receiver 812 to allow transmission and reception of data between the wireless communication device 802 and a remote location, such as for example an AP of a wireless communication network. The transmitter 810 and receiver 812 may be combined into a transceiver 814. A single or a plurality of transceiver antennas 816 may be attached to the housing 808 and electrically coupled to the transceiver 814. The wireless communication device 802 may also include (not shown) multiple transmitters, multiple receivers, and multiple transceivers.

The wireless communication device 802 may also include a signal detector 824 that may be used in an effort to detect and quantify the level of signals received by the transceiver 814. The signal detector 824 may detect such signals as total energy, energy per subcarrier per symbol, power spectral density and other signals. The signal detector 824 may be configured to detect at least RSRP, RSRQ, and SINR. In some embodiments, the signal detector 824 may represent a means for evaluating one or more RF conditions between the wireless communication device 802 and components on the wireless communication network. The wireless communication device 802 may also include a digital signal processor (DSP) 820 for use in processing signals.

In one embodiment, the wireless communication device 802 may include a clock 818. The clock 818 may continuously update the internal time in the memory 806 of the wireless communication device 802. The processor 804 may continuously check or utilize the internal clock time.

The various components of the wireless communication device 802 may be coupled together by a bus system 822, which may include a power bus, a control signal bus, and a status signal bus in addition to a data bus.

In some implementations of telecommunications networks, issues can occur during mobile terminated calls from the UE while UE is transitioned between APs during a handover procedure. For example, a CSFB call may fail or the call setup of a CSFB call may be significantly delayed as described above with reference to FIGS. 4-7. Therefore, it may be advantageous to delay or prevent the handover procedure if the RF conditions are strong enough or of a high enough quality to enable the continued exchange of messages to complete a CSFB procedure prior to handover of the UE from a source AP to a target AP. In some embodiments, a threshold value may be related to or based off of the RF conditions, as described below, such that if the RF conditions exceed the threshold value, the handover is delayed or prevented and the CSFB procedure may be completed. In some embodiments, the network operator or original equipment manufacturer (OEM) may preselect the threshold value. In other embodiments, the threshold value may be dynamically set and adjustable based on the RF conditions in accordance with the disclosure herein.

It will be understood that the methods and devices disclosed herein are not restricted to only CSFB procedures, but may apply and operate in a substantially similar manner for any procedure involving the exchange of messages between a UE and the various components of a telecommunications network. For example, other LTE based procedures may be carried out via message exchange between the UE and the telecommunications network, such as but not limited to routing area update (RAU), TAU, Voice over LTE (VoLTE) Call Setup, UE capability information, radio link failure (RLF) count inquiry, IMS registration, and LTE attach. These procedures may include the transfer of data packets or user of data along with or in conjunction with the exchange of messages between the UE and the telecommunications network. In these instances, the UE may be configured to consider data traffic of the UE and in the telecommunications network as a whole along with the RF conditions of the source AP. For example, if data traffic is present on the DL or UL while attempting to delay a handover procedure, the UE may be configured to terminate the delay of the handover thereby permitting the UE to be transitioned from the source AP to the target AP. However, where the UE is performing a CSFB call and data traffic is started near in time as the CSFB call, then the UE may be configured to delay and/or prevent the handover procedure. In this case, the UE will eventually be transferred to a 2G/3G technology.

According to aspects of the present disclosure, the UE is configured to detect a procedure executed on the UE in communication with a telecommunications network. In some embodiments, the detection may be based on the reception or transmission of messages exchanged between the UE and the source AP of the telecommunications network used to facilitate the execution of the procedure. The UE may also be configured to determine whether the detected procedure is of a type that qualifies to prevent or delay handover procedures. As described herein, a procedure executed by the UE may be preselected as a "qualifying procedure" where such a procedure may be preselected as to be completed prior to executing a handover procedure in accordance with the disclosure herein. In some aspects, a qualifying procedure may be a procedure to be executed prior to interference from another procedure, for example, a handover procedure. Some qualifying procedure types include, but are not limited to, CSFB, CSFB-WCDMA, CSFB-1x, CSFB-GERAN, TAU, VoLTE call Setup, UE capability information, radio link failure (RLF) count inquiry, IP Multimedia Subsystem (IMS) registration, and LTE attach. In some embodiments, a qualifying procedure includes an exchange of at least one or more messages between the UE and a telecommunications network. In another embodiment, a qualifying procedure may include procedures performed internally in the UE, for example, where the UE may process a signal internally to perform a procedure (e.g., perform a measurement) and process the signal completely within the UE. In some aspects, the qualifying procedure includes processing a signal internal to the UE, the signal being indicative of a procedure executed with the UE. The preselected list of qualifying procedures may be stored in a database or memory of the UE and accessed by a processor based on any detected procedure.

The UE may be configured to determine a detected procedure is a qualifying procedure based on identifiers in exchanged messages, activation of certain procedures, activation of applications that perform certain procedures, or any other method of determining a procedure is a qualifying procedure. In some embodiments, determination of a qualifying procedure may be based on specific identifiers contained in the messages exchanged in the carrying out of the qualifying procedure, for example an identifier may be included in the midamble 214 of carrier 200 of FIG. 2. In some embodiments, the UE may be configured to detect the activation of a qualifying procedure, for example, the UE may detect an initiation or starting of a call setup procedure. This may include detecting the an initiation step or a signal from the UE indicative of starting the qualifying procedure. In another embodiment, the UE may be configured to detect the activation of an application known to the UE to operate in conjunction with, as part of, or as an initiation of a qualifying procedure. For example, a given application may send messages that are part of any one or more of the qualifying procedures. The UE may be aware or configured to detect the activation of this application and then determine that the activated procedure is a qualifying procedure.

In some embodiments, the network operator or OEM preselects a set or subset of procedures to be preselected as qualifying procedures. For example, if the features of this disclosure are enabled for a given qualifying procedure, then the UE evaluates the RF conditions (e.g., RSRP, RSRQ, and SINR) and determines whether to prevent or delay the handover of the UE while executing the qualifying procedure. The UE evaluates the RF conditions and determines whether they are above a threshold value. In this way, the UE can be configured to determine whether to execute the identified qualifying procedure without failure or delay by preventing the execution of the handover procedure. Handover events include, but are not limited to, measurement events (A1, A2, A3, A4, A5, etc.)). In some embodiments, the handover procedure is delayed for a determined amount of time and then is permitted to be executed.

In some embodiments, the threshold value of the RF condition can be set by the network operator or the OEM. The threshold value may be a threshold execution time or a threshold RF condition. For example, the network operator or OEM may preset an expected time of execution for procedures carried out by the UE, where the expected time of execution may represent a threshold value. In some embodiments, expected execution times are set for the qualifying procedures. The expected time of execution may correspond to a given RF condition. The UE can measure one or more current RF conditions on the DL between the source AP and the UE, and based on this determine if the current RF conditions are such that the procedure would be executed, based on the expected time of execution, within the threshold execution time. If not, the UE determines that the threshold value is not met. If the RF conditions are such that the procedure would be executed within the threshold execution time, then the UE determines that the threshold value is met. In some embodiments, the network operator or OEM may present a RF condition instead of the expected time of execution. Where the threshold value is exceeded, the UE may be configured to delay or prevent sending a measurement report to the source AP.

In some embodiments, the UE is configured to maintain a table of expected execution times for one or more procedures for corresponding RF conditions. For example, the table may include one or more RF conditions and a corresponding expected time of execution for one or more procedures at each RF condition. In another embodiment, the expected execution time may be based on an association of at least past execution of at least one procedure with the RF condition between the UE and the access point during past execution of the procedure. In this way, the UE may have multiple threshold values provided in the table. Each procedure contained in the table can include an individual threshold execution time based on expected time of execution that the network operator or OEM determines to be acceptable and an RF condition associated with each expected time of execution.

In one aspect, the threshold value can be dynamically adaptable within a predetermined range. For example, based on multiple executions of a given procedure (e.g., multiple past executions), the UE can maintain statistics about the time to carry out each execution and the various RF conditions of each execution. In this way, the UE may be configured to monitor each execution of a procedure and update the table based on statistical analysis of the multiple previous executions and associated RF conditions, thereby adjusting the expected time of execution of a procedure, and thus the threshold value can be updated as well.

According to another aspect of the present disclosure, the telecommunications network may be configured to prevent or delay the handover procedure. The same general concepts disclosed above apply. However, the telecommunications network can be configured to detect the triggering procedure type that may, if performed at near in time as a handover procedure, qualify to prevent or delay the handover procedure. The telecommunications network may be configured similarly to the UE to detect a procedure and determine that procedure is a qualifying procedure. The telecommunications network may be configured to evaluate the RF conditions based on the signal quality between the source access point and the UE or based on the distance of the UE from the source access point. For example, the source access point may receive one or more measurement reports from the UE that include evaluations of current RF conditions (e.g., RSRP, RSRQ, and SINR). In another embodiment, the source AP may receive a sounding reference signal (SRS), where the RF conditions may be based, at least in part, on the power level of the received SRS. The SRS is a reference signal that can be transmitted on the UL by the UE, and may be used by an AP to estimate the RF condition of the UL channel quality. In other embodiments, the RF condition may be based on estimates derived from communications on the DL. In this way, the telecommunications network can be configured to evaluate the RF conditions and compare the conditions to the thresholds value in accordance with the disclosure herein. Also, the telecommunications network can maintain statistics on the executed procedures and RF conditions to adjust and update the thresholds as necessary. When a procedure is detected and the RF conditions or the expected time of execution are above the threshold value, the telecommunications network may delay or prevent the transmission of a handover configuration or the handover command to the UE. Thus, the UE may not receive the handover configuration and/or a handover command from the telecommunications network, and the UE may not send a measurement report to initiate and execute a handover procedure.

Figure 9:
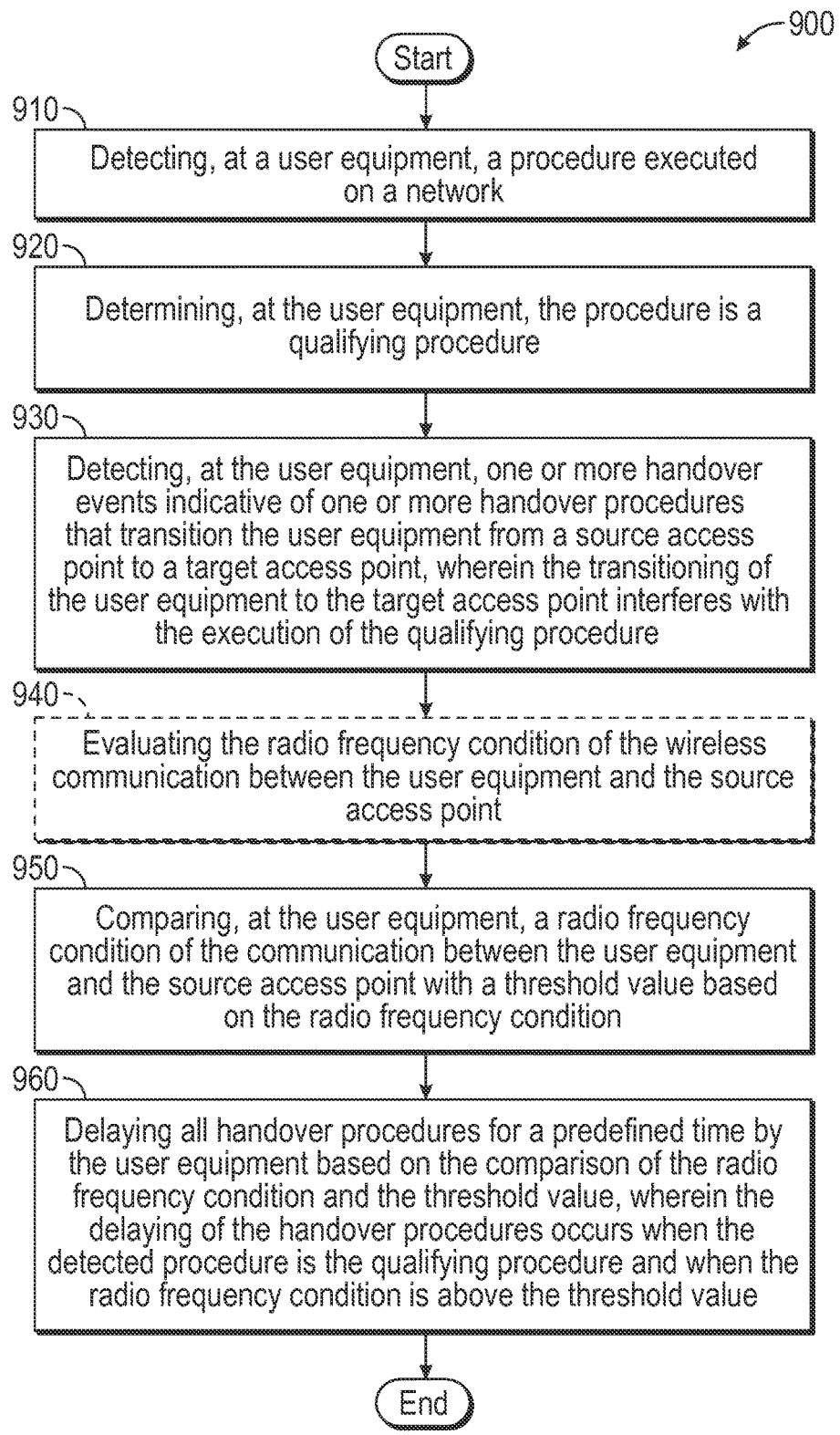
FIG. 9 is a flow chart of an aspect of an exemplary method of wireless communication.

FIG. 9 illustrates a process flow diagram of a method 900 for providing wireless communications over a telecommunications network. The method 900 may be implemented in whole or in part by, or in connection with, the devices described herein such as the UE, APs, and network components shown in FIGS. 1, 4, and 5. Those having ordinary skill in the art will appreciate that other components may be used to implement one or more of the steps described herein. Although blocks may be described as occurring in a certain order, the blocks can be reordered, blocks can be omitted, and/or additional blocks can be added.

At block 910, a UE detects the execution of a procedure on a telecommunications network. In some aspects, the procedure is an exchange of data, messages, signals or information between components of UE and a communication network. In some embodiments, the detection may be based on the reception or transmission of messages exchanged between the UE and the telecommunications network used to facilitate the execution of the procedure. In some aspects, the procedure is a CSFB procedure as describe above in reference to FIGS. 4 and 5. The CSFB procedure can be, but is not limited to, CSFB, CSFB-WCDMA, CSFB-1x, or CSFB-GERAN procedures. The CSFB procedure may be any procedure configured to transition a mobile terminating or originating voice call from a first RAN to a second RAN. In other aspects, the procedure is an LTE procedure including the exchange of one or more data packets, such as but not limited to, TAU, VoLTE Call Setup, UE capability information, RLF count inquiry, IMS registration, and LTE attach.

In some aspects, the UE is in communication with the network facilitated by a source AP. The source AP can be an AP configured to provide wireless communication between a telecommunications network and a UE, where the UE is located within the geographic region served by the AP.

At block 920, the UE determines whether the detected procedure is a qualifying procedure. In some embodiments, the qualifying procedure includes an exchange of at least one or more messages. This determination may be based on specific identifiers contained in the messages exchanged in the carrying out of the qualifying procedure, for example an identifier may be included in the midamble 214 of carrier 200 of FIG. 2. In other embodiments, the determination may be based on an activation of a certain procedures known or stored in the UE to be qualifying procedures. In another embodiment, the determination may be based on the activation of an application known to the UE to include qualifying procedures in carrying out one or more functions of the application. In some aspects, a network operator or original equipment manufacturer can preselect a set or subset of procedures that may be stored in the UE as qualifying procedures. For example, a CSFB procedure may be preselected as a qualifying procedure. A set or subset of procedures may be stored in the UE, such that the UE may be configured to identify a procedure that is executed as a qualifying procedure.

At block 930, the UE detects one or more handover events indicative of one or more handover procedures that transition the UE from the source AP to a target AP. In some embodiments, the UE may detect, at the receiver, one or more handover events including, but are not limited to, measurement events (A1, A2, A3, A4, A5, etc.)). In some embodiments, the UE may detect a handover event by receiving a handover configuration request transmitted to the UE due to a mobility event, where the UE is moving between geographic regions served by different APs (e.g., an intra-RAT handover). In other aspects, the handover configuration requests are transmitted due to a transition of the UE from a first RAN to a second RAN (e.g., an IRAT handover). In some aspects, the handover configuration requests may be transmitted in parallel with the execution of the qualifying procedure.

In one aspect, the handover of the UE to the target AP interferes or causes a failure of the execution of the qualifying procedure. In some embodiments the interfering of the execution of the qualifying procedure occurs as a result of the handover procedure and the qualifying procedure executing at approximately the same time. In other embodiments, the handover procedure interferes with the qualifying procedure because the handover procedure is part of or runs in conjunction with the qualifying procedure.

At optional block 940, the UE can be configured to evaluate one or more RF conditions of the communication between the UE and the source AP. In one embodiment, the evaluated RF condition is the RF condition currently experienced between the UE and the source AP. The UE can be configured to evaluate the RF conditions on the DL between the source AP and the UE. The RF conditions can be based on, but not limited to, RSRP, RSRQ and SINR measurements between the UE and the source AP.

At block 950, the UE compares the one or more RF conditions of the communication between the UE and the source AP with a threshold value based on the RF conditions. In some aspects, the threshold value is a predetermined time of execution and/or a predetermined RF condition. In an embodiment where the threshold is a time of execution, the UE evaluates the RF condition and locates the expected time of execution for that RF condition. The UE then compares the expected time of execution with the threshold time of execution. In other embodiments, the threshold value may be a predetermined RF condition, and the UE may be configured to compare the evaluated RF condition to the threshold RF condition.

In some embodiments, the UE is configured to maintain and access a look up table of expected execution times for the detected procedure, including the qualifying procedure. The expected execution time may be based on an association, performed by the UE, the telecommunications network, or the operator/OEM, of at least one past execution of the procedure with one or more RF conditions between the UE and the source AP during the past execution. In some embodiments, the look up table may be updated following each iteration of the procedure. In some instances, the look up table may not include an execution time for every possible RF condition, however, the UE may be configured to estimate the execution time based on neighboring data points.

In some aspects, the threshold value can be dynamically adaptable within a predetermined range by the UE. The UE can be configured to continuously monitor execution times and RF conditions each time a procedure is performed on the UE and telecommunications network. Based on previously executed procedures, the UE can update the RF condition and corresponding execution time. Thus, the UE can be configured to update and adjust the minimum RF condition thresholds for which the UE will delay sending a measurement report to the AP.

At block 960, the UE can delay any handover procedure, including all handover procedures, for a predefined time based on the comparison of the RF condition and the threshold value. In some aspects, the delay of the handover procedure occurs when the detected procedure is a qualifying procedure and when the RF condition satisfies a threshold that is based on the threshold value. For instance, the RF condition may satisfy the threshold that is based on the threshold value when the RF condition exceeds the threshold value, when the RF condition meets or exceeds the threshold value, when the RF condition is below the threshold value, or when the RF condition meets or is below the threshold value—depending, for example, on the particular type of RF condition and/or the particular type of threshold. The UE checks if the procedure is a qualifying procedure and prevents or delays the handover procedure by preventing the exchange of one or more messages between the UE and source AP configured to effectuate the handover. For example, the UE may delay transmitting a measurement report to the source AP. In another embodiment, the source AP may delay transmitting a handover configuration or handover command to the UE. In some aspects, the UE delays or prevents the handover procedure when the qualifying procedure and handover procedure are executed in parallel. In other aspects, the UE can delay a handover procedure that is triggered in conjunction or as part of a qualifying procedure (e.g., an IRAT handover during a CSFB procedure). The handover procedure may be triggered simultaneously or near in time with the qualifying procedure, and may be executed in parallel.

One non-limiting advantage of some embodiments disclosed herein is that delaying the handover procedure serves to permit the exchange of each message or signal necessary to complete a qualifying procedure. In this way, the handover procedure does not interfere with the completion of the qualifying procedure. In some aspects, the UE may determine to delay the handover procedure, and permit the handover procedure to be executed following the completion of the qualifying procedure. In other aspects, the UE may determine to not perform the handover procedure following the qualifying procedure, because the handover procedure may no longer be necessary for the continued operation of the UE.

In another aspect of the disclosure herein, the UE may be performing a procedure that includes the exchange of data traffic on the DL or UL while the UE delays the handover procedure. In this instance, the UE may be configured to permit the handover to be carried out by transmitting the measurement report, such that the exchange of data can be completed. For example, LTE procedures may require an exchange of data packets that cannot be completed on the current source AP even though the threshold value for the given LTE procedure may be meet. Thus, a handover to the target AP can be permitted to enable the exchange of the data packets. Alternatively, in a situation where the UE is performing a CSFB call and data traffic is transmitted near in time, then the UE may be configured to delay or prevent the handover procedure. In this case, the UE will eventually be transferred to a 2G/3G technology.

Figure 10:
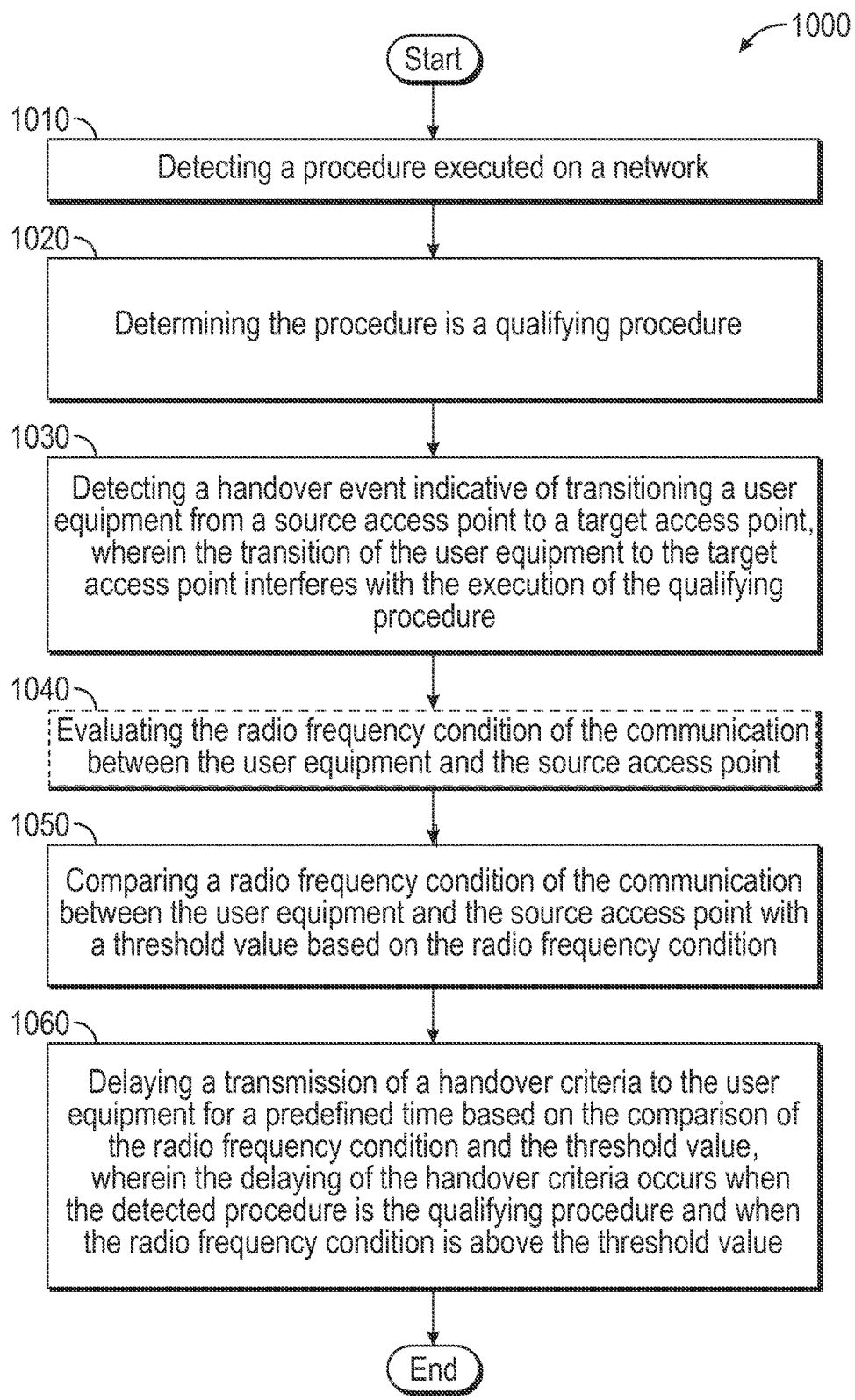
FIG. 10 is a flow chart of aspect of another exemplary method of wireless communication.

FIG. 10 illustrates a process flow diagram of a method 1000 for providing wireless communications over a telecommunications network. The method 1000 may be implemented in whole or in part by, or in connection with, the devices described herein such as the various components of the telecommunications network, UE, and APs shown in FIGS. 1, 4, and 5. Those having ordinary skill in the art will appreciate that other components may be used to implement one or more of the steps described herein. Although blocks may be described as occurring in a certain order, the blocks can be reordered, blocks can be omitted, and/or additional blocks can be added.

At block 1010, an execution of a procedure over the telecommunications network is detected. In some aspects, the procedure is an exchange of data, messages, signals or information between components of UE and a communication network. In some embodiments, the detection may be based on the reception or transmission of messages exchanged between at least one of the APs of the telecommunications network the UE used to facilitate the execution of the procedure. Accordingly, the reception of a messages or data at one AP may represent a detection of a procedure. It is also noted, that the various components of the telecommunications network may be configured to receive messages from the UE and between the components, thus, reception of messages or data at these various components may represent a detection of a procedure as well. In some aspects, the procedure is a CSFB procedure as describe above in reference to FIGS. 4 and 5. The CSFB procedure can be, but is not limited to, CSFB, CSFB-WCDMA, CSFB-1x, or CSFB-GERAN procedures. In other aspects, the procedure is an LTE procedure including the exchange of one or more data packets.

At block 1020, the UE determines whether the detected procedure is a qualifying procedure. In some embodiments, the qualifying procedure includes an exchange of at least one or more messages. This determination may be based on specific identifiers contained in the messages exchanged in the carrying out of the qualifying procedure, for example an identifier may be included in the midamble 214 of carrier 200 of FIG. 2. In some aspects, a network operator or original equipment manufacturer can preselect a set or subset of procedures that may be stored a server or database of the telecommunications network. The telecommunications network may be configured to receive a message at any one of the APs, the message may include an identifier, and a server (e.g., the MME or the IMS server) may be configured to compare that identifier with the stored set of qualifying procedures.

At block 1030, one or more handover events are detected, the handover events being indicative of one or more handover procedures that transition the UE from the source AP to a target AP. In some embodiments, the AP may detect a handover event in response to receiving a measurement report transmitted by the UE. In some embodiments, the AP may determine that the UE has traveled outside of its geographic region of service, and determine that a handover to a target AP is necessary for continued service to the UE within the telecommunications network. In other embodiments, the telecommunications network may be configured to compare the signal strengths of the cells servicing and surrounding the UE, and based on this comparison determine that a handover is necessary. In some aspects, the handover procedure may be detected as a result of execution of certain procedures (e.g., CSFB procedures). In some aspects, the handover procedure may be detected in parallel with the execution of the qualifying procedure. In some embodiments, the handover of the UE to the target AP interferes or causes a failure of the execution of the qualifying procedure.

At optional block 1040, the telecommunications network is configured to evaluate one or more RF conditions of the communication between the UE and the source AP. In one embodiment, the evaluated RF condition is the RF condition currently experienced between the UE and the source AP. The telecommunications network may be configured to evaluate the RF conditions based on the signal quality between the source access point and the UE or based on the distance of the UE from the source access point. For example, the source access point may receive one or more measurement reports from the UE that include evaluations of current RF conditions (e.g., RSRP, RSRQ, and SINR). In another embodiment, the source AP may receive a sounding reference signal (SRS), where the RF conditions may be based, at least in part, on the power level of the received SRS. The SRS is a reference signal that can be transmitted on the UL by the UE, and may be used by an AP to estimate the RF condition of the UL channel quality. In other embodiments, the RF condition may be based on estimates derived from communications on the DL. In this way, the telecommunications network can be configured to evaluate the RF conditions and compare the conditions to the thresholds value in accordance with the disclosure herein.

At block 1050, the telecommunications network compares the one or more RF conditions of the communication between the UE and the source AP with a threshold value based on the RF conditions. The threshold value may be determined in a substantially similar manner as to the threshold of block 950 of FIG. 9. However, the telecommunications network or a component thereof is configured to receive, store, maintain, and adjust the threshold value.

At block 1060, the telecommunications network can delay or prevent transmitting one or more handover criteria indicative of a handover procedure for a predefined time based on the comparison of the RF condition and the threshold value, thereby preventing or delaying all handover procedures. In some aspects, the delay of transmitting the handover criteria occurs when the detected procedure is a qualifying procedure and when the RF condition satisfies a threshold that is based on the threshold value. For instance, the RF condition may satisfy the threshold that is based on the threshold value when the RF condition exceeds the threshold value, when the RF condition meets or exceeds the threshold value, when the RF condition is below the threshold value, or when the RF condition meets or is below the threshold value—depending, for example, on the particular type of RF condition and/or the particular type of threshold. The telecommunications network determines whether the procedure is a qualifying procedure and prevents or delays transmitting the handover criteria by preventing the exchange of one or more messages between the UE and source AP configured to effectuate the handover procedure. For example, the source AP may delay or prevent transmission of a handover configuration to the UE which, in turn, causes the UE to not transmit a measurement report indicative of a handover event. In another embodiment, the source AP may delay or prevent the transmitting of a handover command, the handover command generally being transmitted following the reception of a measurement report from the UE. In some aspects, the source AP delays or prevents transmitting the handover criteria when the qualifying procedure and handover procedure are executed in parallel. In other aspects, the source AP can delay a transmitting a handover criteria where the handover procedure is triggered in conjunction or as part of a qualifying procedure (e.g., an IRAT handover during a CSFB procedure). The handover procedure may be triggered simultaneously or near in time with the qualifying procedure, and may be executed in parallel.

One non-limiting advantage of some embodiments disclosed herein is that delaying the handover procedure serves to permit the exchange of each message or signal necessary to complete a qualifying procedure. In this way, the handover procedure does not interfere with the completion of the qualifying procedure. In some aspects, the source AP may determine to delay the handover procedure, and permit the handover procedure to be executed following the completion of the qualifying procedure. In other aspects, the source AP may determine to not perform the handover procedure following the qualifying procedure, because the handover procedure may no longer be necessary for the continued operation of the UE.

In another aspect of the disclosure herein, the procedure may include the exchange of data traffic on the DL or UL while the source AP delays the handover procedure. In this instance, the source AP may be configured to permit the handover by transmitting the handover configuration or the handover command, or both, such that the exchange of data can be completed. For example, LTE procedures may require an exchange of data packets that cannot be completed on the current source AP even though the threshold value for the given LTE procedure may be meet. Thus, a handover to the target AP can be permitted to enable the exchange of the data packets. Alternatively, when performing a CSFB call and data traffic is transmitted near in time, then the handover may be delayed or prevented. In this case, the UE will eventually be transferred to a 2G/3G technology.

Figure 11:
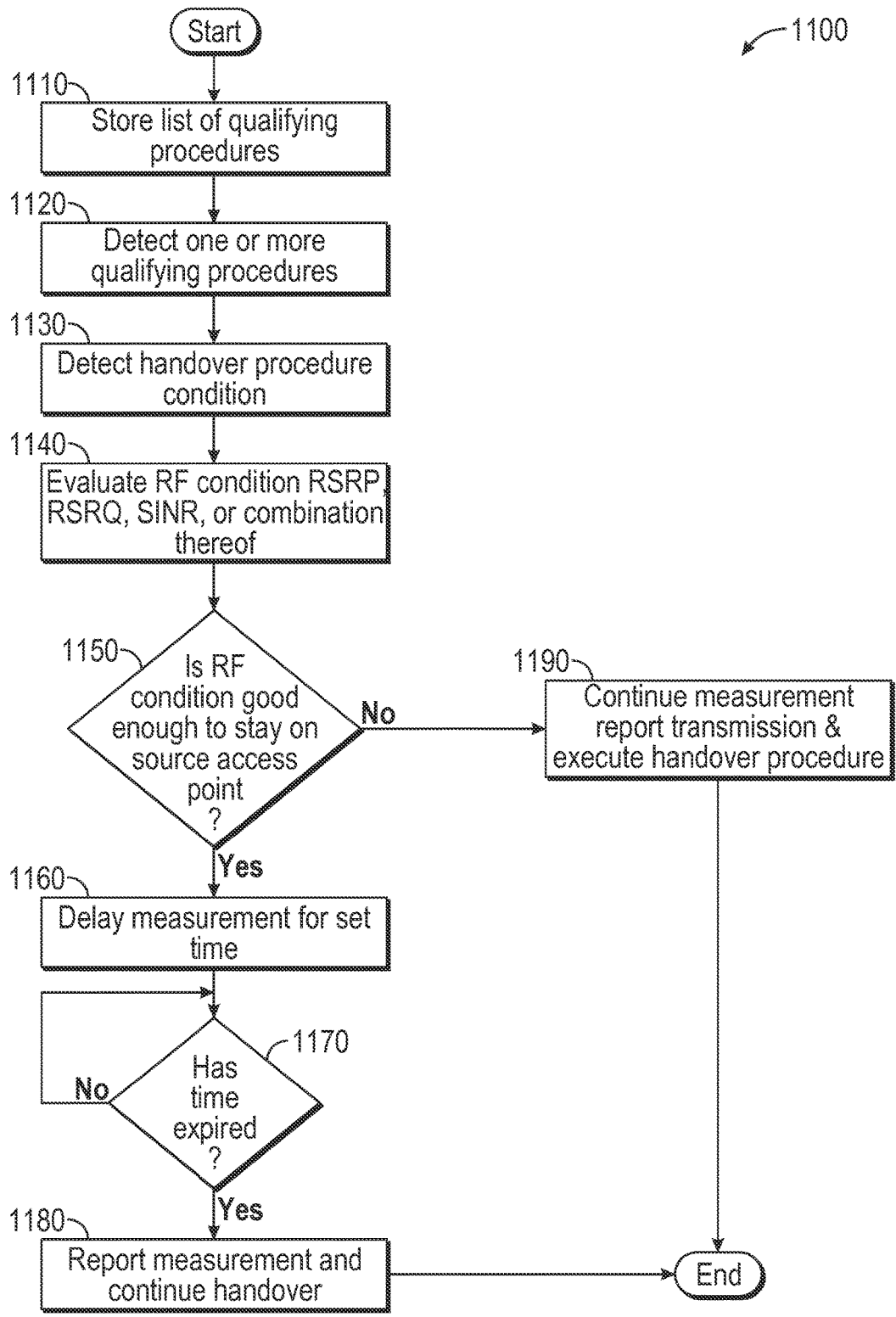
FIG. 11 is a flow chart of another exemplary method of wireless communication.

FIG. 11 is a flow chart of another aspect of an exemplary method 1000 of wireless communication. The method 1100 may be implemented in whole or in part by, or in connection with, the devices described herein such as the UE, APs, and network components shown in FIGS. 1, 4 and 5. Those having ordinary skill in the art will appreciate that other components may be used to implement one or more of the steps described herein. Although blocks may be described as occurring in a certain order, the blocks can be reordered, blocks can be omitted, and/or additional blocks can be added.

At block 1110, a list of qualifying procedures is stored in the UE. In some embodiments the list of qualifying procedures is stored in the UE, for example in a database and/or memory 806 of FIG. 8. In other embodiments, the list of qualifying procedures is stored on a server or database of the telecommunications network. The list, set, or subset of procedures that are qualifying procedures may be preselected and determined by the network operator, service operator, and/or the OEM of the UE, as described above.

At block 1120, the execution of a qualifying procedure on a wireless communications network is detected. In some embodiments, the UE may be configured to detect the execution on the qualifying procedure based on an exchange of messages having predetermined identifiers. In some embodiments, the identifiers may be contained in the carrier 200 of FIG. 2. In other embodiments, the telecommunications network may be configured to detect the execution of a qualifying procedure based on the reception of such messages having identifiers.

At block 1130, a handover procedure condition is detected. A handover procedure condition may be one or more conditions that initiate a handover procedure, for example a mobility event of the UE. In some embodiments, the handover procedure condition is detected by the UE, where the UE receives a handover configuration and/or the UE detects a handover event as described above. In some embodiments, the handover procedure is detected simultaneously with the detection or execution of the one or more qualifying procedures. In other embodiments, the handover procedure is initiated by or as part of the one or more qualifying procedures.

In some embodiments, block 1130 may represent the UE receiving one or more handover configuration requests configured to transition the UE from the source AP to a target AP. In some aspects, the handover configuration requests are transmitted due to a UE mobility event, where the UE moves between different geographic regions where a first region is severed by the source AP and a second region is served by a target AP (e.g., an intra-RAT handover). In other aspects, the handover configuration requests are transmitted due to a transition of the UE from a first RAN to a second RAN (e.g., an IRAT handover). In some aspects, the handover configuration requests may be transmitted in parallel with the execution of the qualifying procedure. In some embodiments, the handover of the UE to the target AP interferes or causes a failure of the execution of the qualifying procedure.

At block 1140, one or more RF conditions are evaluated to determine the current signal strength of the connection between the UE and the source AP. The RF conditions can be based on, but not limited to, RSRP, RSRQ and SINR measurements or a combination of these measurements. In some embodiments, the RF conditions may be based on the communication between the UE and the source AP on the DL or UL.

At decision block 1150, a determination is made as to whether one or more RF conditions evaluated at block 1140 are strong enough or high enough quality to maintain a connection between the UE and the source AP. In one embodiment, the UE compares the RF condition of block 1140 with a predetermined threshold value based, at least in part, on at least one of the RF conditions of block 1140. In another embodiment, the communication network is configured to compare at least one of the RF conditions of block 1140 to a threshold RF condition or threshold expected time of execution, in accordance with the disclosure herein. If the compared RF condition of block 1140 exceeds or is greater than the threshold value, then the method 1100 may determine that the one or more RF conditions of block 1140 are strong enough to maintain the connection between the UE and the source AP and proceeds to block 660. If the one or more RF condition of block 1140 is determined to be below or does not exceed the threshold value, then the method 1100 determines the one or more RF conditions of block 1140 are not strong enough to maintain the connection between the UE and the source AP and proceeds to block 1190.

In some aspects, the threshold value can be dynamically adaptable within a predetermined range by the UE. The UE can be configured to continuously monitor execution times and one or more RF conditions each time a procedure is executed. Based on previously executed procedures, the UE can update the threshold value for each procedure, such as a threshold RF condition and an associated threshold execution time. Thus, the UE can be configured to update and adjust the thresholds for which the UE will delay sending a measurement report to the source AP.

At block 1160, after method 1100 determines the threshold value was exceeded by the one or more RF conditions of block 1140, the handover procedure may be delayed. In some embodiments under general operating conditions, the handover procedure may follow in due course following the detection of the handover procedure condition in block 1130. However, where the determination of decision block 1150 is that the threshold value is exceeded and the method 1100 moves to block 1160, the UE may be configured to prevent or delay transmitting a measurement report to the source AP, thereby delaying the handover of the UE to a target AP. In another embodiment, the telecommunications network may delay or fail to send a handover configuration, and as such the UE does not respond by transmitting a measurement report.

In one aspect of block 1160, the delay of the handover procedure can be for a set period of time, e.g., N ms. In one embodiment, the set period of time represents an amount of time the UE delays sending the measurement report. The period of time for delaying the handover may be based on one or more factors that are, in part, based on the characteristics of the qualifying procedure, the capabilities of the UE, data traffic of the UE and/or telecommunications network, and one or more RF conditions on the DL or UL between the UE and the source AP. For example, the amount of time may be based on the detected qualifying procedure or may be the same amount of time for each detected procedure. For example, the amount of time may be different for a CSFB procedure as compared to a TAU procedure. The period of time may also be based on the expected time of execution stored in the look up table described above in reference to the determining a threshold value. In another embodiment, the time period may also be indicated by the degradation rate or degradation slope of the RF condition between the UE and the source AP. For example, the faster the RF condition degrades the less time the handover procedure may be delayed. In yet another embodiment, the period of time may also be related to the processing speed or capabilities of the UE, for example, the faster that UE is capable of executing a procedure the shorter the period of time necessary for delaying the handover. In some embodiments, a combination of these factors can be used to determine the amount of time to delay the handover. Each factor may be weighed and considered individually or in combination such that each factor may be provided a different weight in relation to the other factors in determining the period of time to delay the handover.

At decision block 1170, a determination is made as to whether the time period of block 1160 has expired. In some embodiments, clock 818 of FIG. 8 may be utilized to determine whether the time period has expired. If the time period has not expired, then the method 1100 waits until the time period for delaying the handover has expired. If the time period has expired, then method 1100 proceeds to block 1180.

At block 1180, the handover procedure is executed thereby transitioning the UE from the source AP to the target AP. In one embodiment, execution of the handover procedure includes the UE transmitting the measurement report, having been delayed in blocks 1160 and 1170, to the source AP and the handover procedure is executed in accordance with FIG. 6 and the accompanying description. In some embodiments, block 1180 may represent an instance where the source APs transmits a handover configuration to the UE, and the UE transmits the measurement report to the source AP in response thereto. In this instance, the telecommunications network or a component thereof may cause the delay or prevention in executing the handover procedure.

At block 1190, after method 1100 determines the threshold value was not exceeded by the one or more RF conditions of block 1140, the handover procedure is permitted to be carried out in accordance with the description above with reference to FIG. 6. In one embodiment, at block 1190 the UE may transmit a measurement report to the source AP to initiate the handover procedure. The UE may then be transitioned from the source AP to the target AP based on the measurement reporting in accordance with the description in reference to FIG. 6.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communication, comprising:
    detecting, at a user equipment, a procedure executed on a network, the procedure including one or more messages exchanged between the user equipment and a source access point;
    detecting, at the user equipment, one or more handover events indicative of transitioning the user equipment from the source access point to a target access point, wherein the transitioning of the user equipment to the target access point interferes with the execution of the procedure;
    determining, at the user equipment, the procedure is a qualifying procedure indicative that the procedure is to be executed prior to the transitioning of the user equipment;
    comparing, at the user equipment, a radio frequency condition of the communication between the user equipment and the source access point for executing the qualifying procedure to a threshold of the radio frequency condition; and
    delaying, by the user equipment, transitioning of the user equipment for a predefined time based on the comparison of the radio frequency condition to the threshold when the detected procedure is the qualifying procedure and when the radio frequency condition satisfies the threshold.

2. The method of claim 1, wherein the transitioning of the user equipment to the target access point interferes with the execution of the procedure when at least one of the following occurs:
    transitioning of the user equipment and the procedure occur at approximately the same time, and
    the transitioning is part of the execution of the procedure.

3. The method of claim 1, wherein the threshold is dynamically adaptable based on an expected execution time of the qualifying procedure related the radio frequency condition.

4. The method of claim 3, wherein the user equipment is configured to maintain a table of one or more expected execution times for the qualifying procedure, wherein the expected execution times are based on an association of at least one past execution of the qualifying procedure with the radio frequency condition during the past execution, wherein table of expected execution times is updated after each execution of the qualifying procedure.

5. The method of claim 1, wherein the procedure is determined to be the qualifying procedure based on a preselected list of qualifying procedures, wherein the preselected list includes at least a circuit switched fallback procedure (CSFB).

6. The method of claim 5, wherein the preselected list comprises at least one of: a CSFB procedure, tracking area update, voice over LTE call setup, user equipment capability information, radio link failure count inquiry, IP multimedia subsystem registration, and LTE attachment procedures.

7. The method of claim 1, further comprising evaluating the radio frequency condition of the wireless communication between the user equipment and the source access point.

8. The method of claim 7, wherein the radio frequency condition is based on at least one of: a reference signal received power (RSRP), reference signal received quality (RSRQ), and signal-to-interference-plus-noise ratio (SINR).

9. The method of claim 1, wherein the predefined time is based, on at least one of the following: the detected procedure, the threshold, a degradation slope of the radio frequency condition; and one or more operating characteristics of the user equipment.

10. The method of claim 1, wherein the delaying the handover of the user equipment comprises delaying transmission of a measurement from the user equipment to the source access point, the measurement report, the measurement report indicative of the detected one or more handover events for triggering the handover.

11. The method of claim 1, wherein the qualifying procedure includes processing a signal internal to the user equipment, the signal being indicative of a procedure executed within the user equipment.

12. A method for wireless communication, comprising:
    detecting a procedure executed on a network, the procedure including one or more messages exchanged between the user equipment and a source access point;
    detecting a handover event indicative of transitioning the user equipment from a source access point to a target access point, wherein the transition of the user equipment to the target access point interferes with the execution of the procedure;
    determining the procedure is a qualifying procedure indicative that the procedure is to be executed prior to the transitioning of the user equipment;
    comparing a radio frequency condition of the communication between the user equipment and the source access point for executing the qualifying procedure to a threshold of the radio frequency condition; and
    delaying a transmission of a handover criteria to the user equipment for a predefined time based on the comparison of the radio frequency condition to the threshold when the detected procedure is the qualifying procedure and when the radio frequency condition satisfies the threshold.

13. The method of claim 12, further comprising evaluating the radio frequency condition of the communication between the user equipment and the source access point.

14. The method of claim 13, wherein the evaluating the radio frequency condition further comprises receiving a measurement report indicative of the radio frequency condition between the user equipment and the source access point.

15. The method of claim 13, wherein the evaluating the radio frequency condition further comprises determining a distance between the source access point and the user equipment, wherein the distance is indicative of the radio frequency condition.

16. The method of claim 13, wherein the evaluating the radio frequency condition further comprises receiving a sounding reference signal at the source access point, wherein an estimate of the radio frequency condition is based on the sounding reference signal.

17. The method of claim 13, wherein the qualifying procedure includes
processing a signal internal to the user equipment, the signal being indicative of a procedure executed within the user equipment.

18. An apparatus for wireless communication comprising:
a receiver configured to detect one or more handover events indicative of transitioning a user equipment from a source access point to a target access point, wherein the transitioning of the user equipment to the target access point interferes with an execution of a procedure; and
a processor configured to:
detect the procedure executed on a network, the procedure including one or more messages exchanged between the user equipment and a source access point;
determine the procedure is the qualifying procedure indicative that the procedure is to be executed prior to the transitioning of the user equipment;
compare a radio frequency condition of the communication between the user equipment and the source access point for executing the qualifying procedure to a threshold of the radio frequency condition; and
delay the transitioning of the user equipment for a predefined time based on the comparison of the radio frequency condition to the when the detected procedure is the qualifying procedure and when the radio frequency condition satisfies the threshold.

19. The apparatus of claim 18, wherein the transitioning of the user equipment to the target access point interferes with the execution of the procedure when at least one of the following occurs:
transitioning of the user equipment and the procedure occur at approximately the same time, and
the transitioning is part of the execution of the procedure.

20. The apparatus of claim 18, wherein the threshold is dynamically adaptable based on an expected execution time of the qualifying procedure related the radio frequency condition.

21. The apparatus of claim 20, wherein the user equipment is configured to maintain a table of one or more expected execution times for the qualifying procedure, wherein the expected execution times are based on an association of at least one past execution of the qualifying procedure with the radio frequency condition during the past execution, wherein table of expected execution times is updated after each execution of the qualifying procedure.

22. The apparatus of claim 18, wherein the procedure is determined to be the qualifying procedure based on a preselected list of qualifying procedures, wherein the preselected list includes at least one of the following: a circuit switched fallback procedure (CSFB), tracking area update, voice over LTE call setup, user equipment capability information, radio link failure count inquiry, IP multimedia subsystem registration, and LTE attachment procedures.

23. The apparatus of claim 18, wherein the processor is further configured to evaluate the radio frequency condition of the wireless communication between the user equipment and the source access point.

24. The apparatus of claim 23, wherein the radio frequency condition is based on at least one of: a reference signal received power (RSRP), reference signal received quality (RSRQ), and signal-to-interference-plus-noise ratio (SINR).

25. The apparatus of claim 18, wherein the predefined time is based on at least one of the following: the detected procedure, the threshold, a degradation slope of the radio frequency condition; and one or more operating characteristics of the user equipment.

26. The apparatus of claim 18, wherein the qualifying procedure includes processing a signal internal to the user equipment, the signal being indicative of a procedure executed within the user equipment.

27. A system for wireless communication comprising:
a means for detecting a procedure executed on a network, the procedure including one or more messages exchanged between the user equipment and a source access point;
a means for detecting a handover event indicative of a transition of a user equipment from the source access point to a target access point, wherein the transition of the user equipment to the target access point interferes with the execution of the procedure;
a means for determining the procedure is a qualifying procedure indicative that the procedure is to be executed prior to the transitioning of the user equipment;
a means for comparing a radio frequency condition of the communication between the user equipment and the source access point for executing the qualifying procedure to a threshold based on the radio frequency condition; and
a means for delaying a transmission of a handover criteria to the user equipment for a predefined time based on the comparison of the radio frequency condition to the threshold when the detected procedure is the qualifying procedure and when the radio frequency condition satisfies the threshold.

28. The system of claim 27, further comprising a means for evaluating the radio frequency condition of the communication between the user equipment and the source access point.

29. The system of claim 28 wherein the means for evaluating the radio frequency condition is further configured to receive a measurement report indicative of the radio frequency condition between the user equipment and the source access point.

30. The system of claim 28, wherein the means for evaluating the radio frequency condition further comprises:
a means for determining a distance between the source access point and the user equipment, wherein the distance is indicative of the radio frequency condition; and a means for receiving a sounding reference signal at the source access point, wherein an estimate of the radio frequency condition is based on the sounding reference signal.

\* \* \* \* \*